United States Patent
Yamamoto et al.

(10) Patent No.: US 8,998,367 B2
(45) Date of Patent: Apr. 7, 2015

(54) IMAGE PROCESSING APPARATUS AND IMAGE PROCESSING METHOD

(75) Inventors: Wakako Yamamoto, Sagamihara (JP); Kiichiro Takahashi, Yokohama (JP); Tetsuya Edamura, Inagi (JP); Toshiyuki Chikuma, Tokyo (JP); Hirokazu Tanaka, Kawasaki (JP); Takatoshi Nakano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 593 days.

(21) Appl. No.: 13/227,867

(22) Filed: Sep. 8, 2011

(65) Prior Publication Data

US 2012/0062636 A1 Mar. 15, 2012

(30) Foreign Application Priority Data

Sep. 15, 2010 (JP) ................................. 2010-206678
Sep. 15, 2010 (JP) ................................. 2010-206679

(51) Int. Cl.
*B41J 2/205* (2006.01)
*G06K 15/10* (2006.01)
*G06K 15/02* (2006.01)

(52) U.S. Cl.
CPC .......... *G06K 15/107* (2013.01); *G06K 15/1881* (2013.01)

(58) Field of Classification Search
CPC ..................... G06K 15/107; G06K 15/1881
USPC ............................................ 347/41, 12, 15
See application file for complete search history.

(56) References Cited

U.S. PATENT DOCUMENTS

| | | | |
|---|---|---|---|
| 6,085,028 A | 7/2000 | Takagi et al. | |
| 6,254,217 B1 | 7/2001 | Askeland et al. | |
| 6,511,143 B1 | 1/2003 | Ishikawa et al. | |
| 6,532,026 B2 | 3/2003 | Takahashi et al. | |
| 6,557,964 B2 | 5/2003 | Kawatoko et al. | |
| 7,079,283 B2 | 7/2006 | Otsuka et al. | |
| 7,735,949 B2 | 6/2010 | Takahashi et al. | |
| 2007/0216724 A1* | 9/2007 | Shibata et al. | 347/41 |
| 2009/0051940 A1 | 2/2009 | Murayama et al. | |
| 2009/0153606 A1* | 6/2009 | Mizutani et al. | 347/12 |
| 2009/0244572 A1 | 10/2009 | Hansaki et al. | |
| 2010/0207985 A1 | 8/2010 | Takahashi et al. | |

FOREIGN PATENT DOCUMENTS

| | | | |
|---|---|---|---|
| JP | 2000103088 A | 4/2000 | |
| JP | 2001-080093 A | 3/2001 | |
| JP | 2004-188626 A | 7/2004 | |
| JP | 2006-001054 A | 1/2006 | |
| JP | 2009-056811 A | 3/2009 | |
| JP | 2009246730 A | 10/2009 | |

* cited by examiner

*Primary Examiner* — Julian Huffman
*Assistant Examiner* — Carlos A Martinez
(74) *Attorney, Agent, or Firm* — Fitzpatrick, Cella, Harper & Scinto

(57) ABSTRACT

There is provided an image processing apparatus in which in a case of tone-expressing one pixel corresponding to a plurality of areas (printing resolution) in a multi-pass print, it is possible to output a uniform image without graininess or density unevenness over all-tone regions from a low-density region to a high-density region. To this end, by referring to dot patterns in which a print or a non-print of dots onto each pixel (area) corresponding to a printing resolution are in advance defined, quantization data is converted into binary data having the higher printing resolution. At this time, the dot patterns are prepared to be different from each other for M times of scans in a multi-pass print of M passes. In consequence, it is possible to restrict a variation of a coverage ratio due to a printing position displacement in each printing scan.

8 Claims, 28 Drawing Sheets

| LEVEL VALUE | DOT ARRANGEMENT |
|---|---|
| 0 | |
| 1 | |
| 2 | |

FIG.3

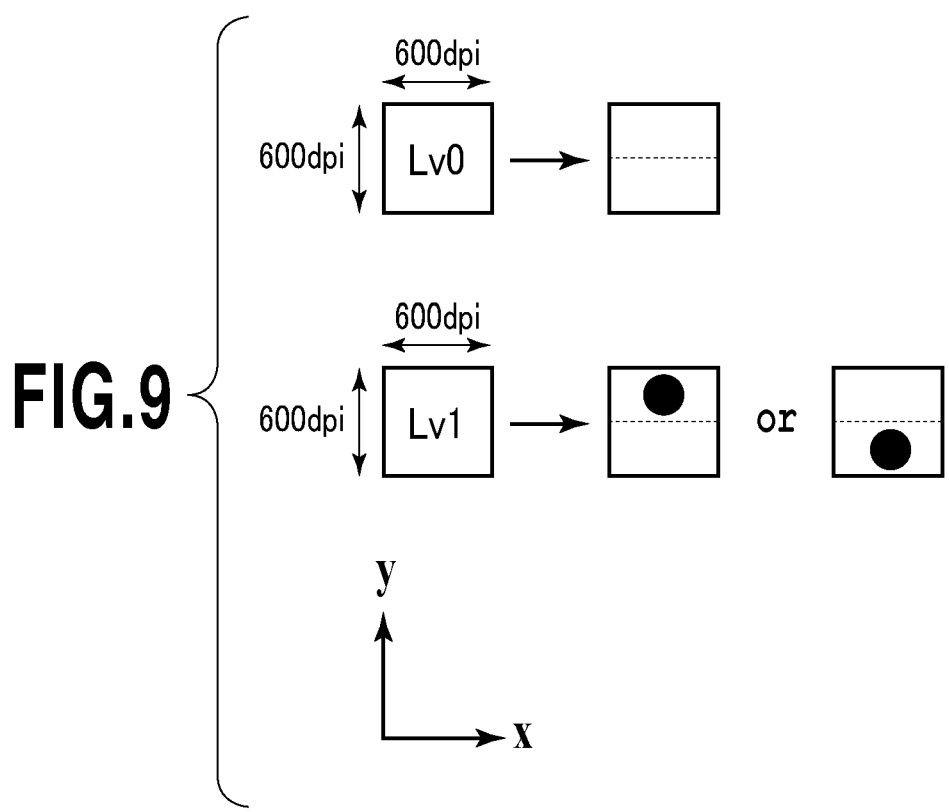

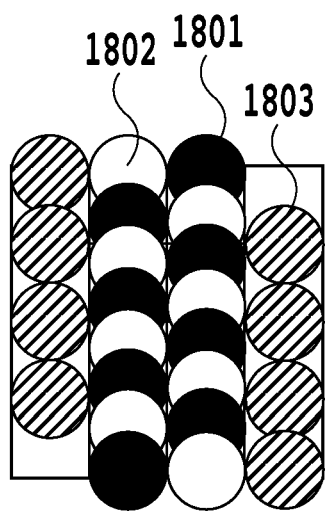
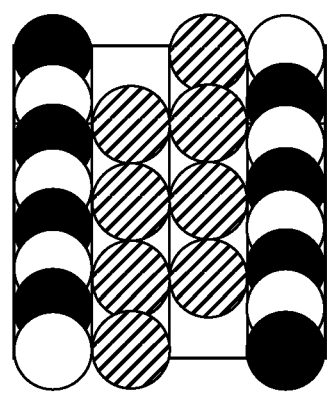
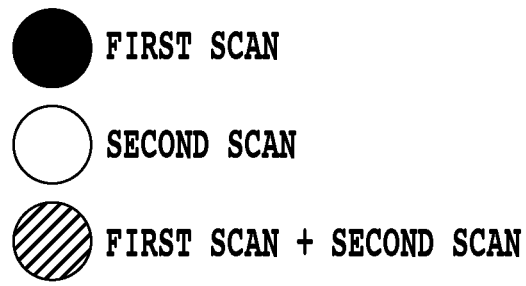
FIG.11A    FIG.11B

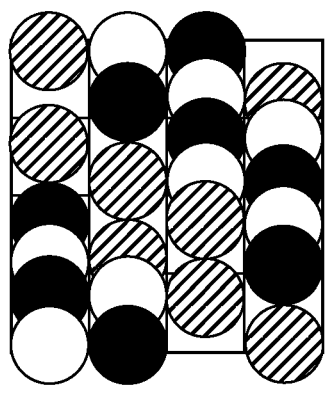
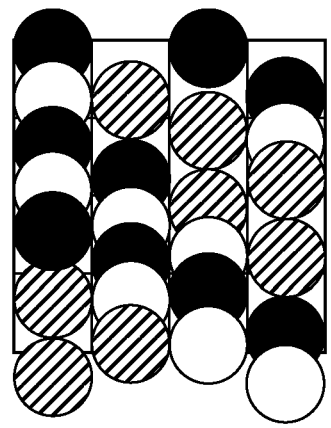
● FIRST SCAN
○ SECOND SCAN
◐ FIRST SCAN + SECOND SCAN
FIG.13A          FIG.13B

○ SINGLE DOT

◐ TWO-DOT OVERLAP DOT

● THREE-DOT OVERLAP DOT

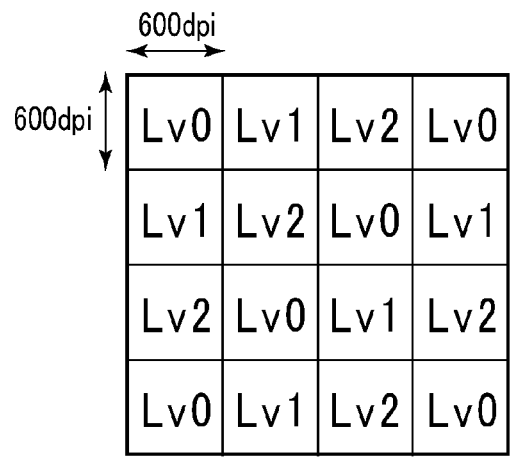
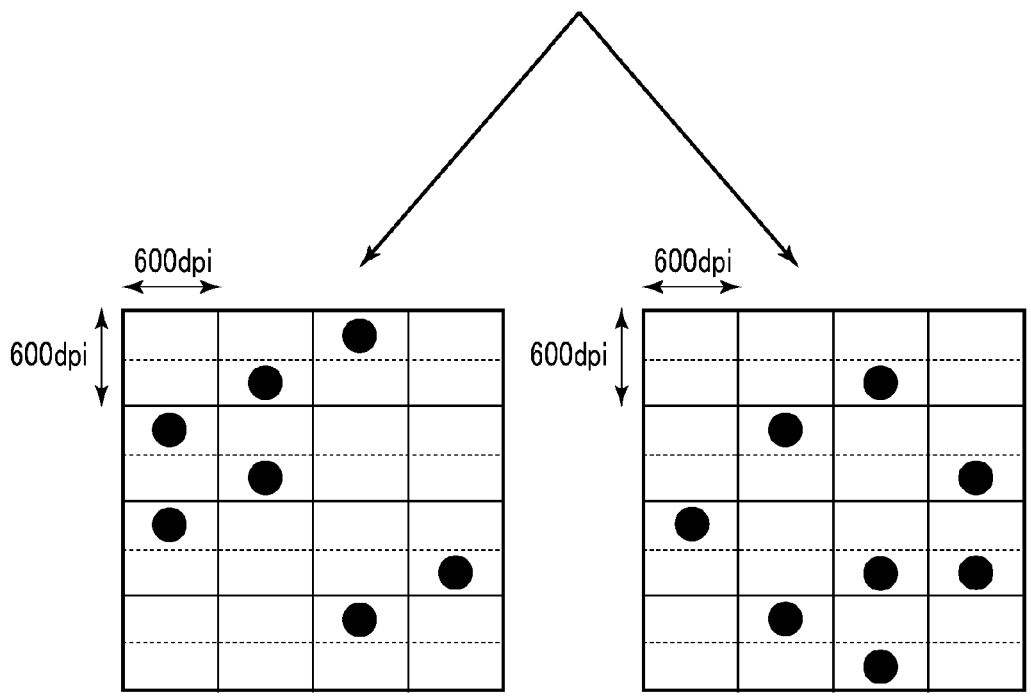
FIG.23A
FIG.23B          FIG.23C

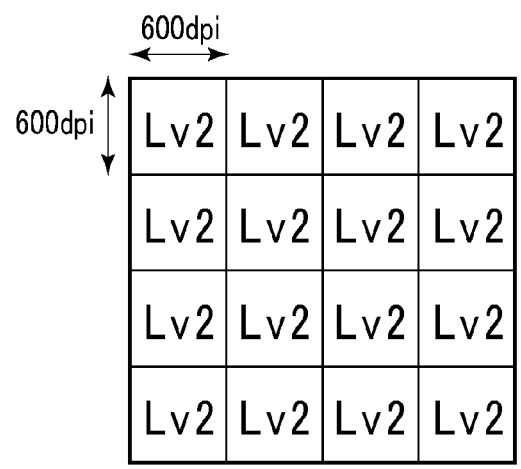
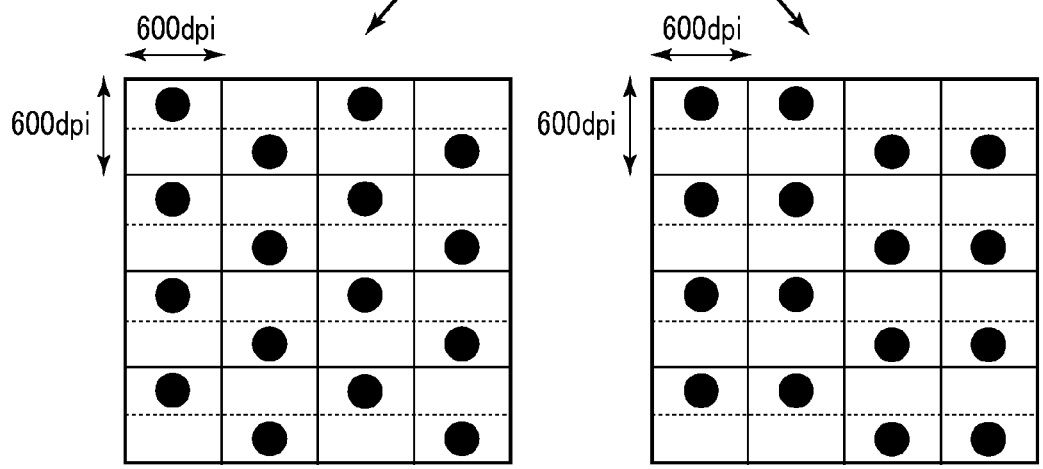
FIG.24A
FIG.24B
FIG.24C

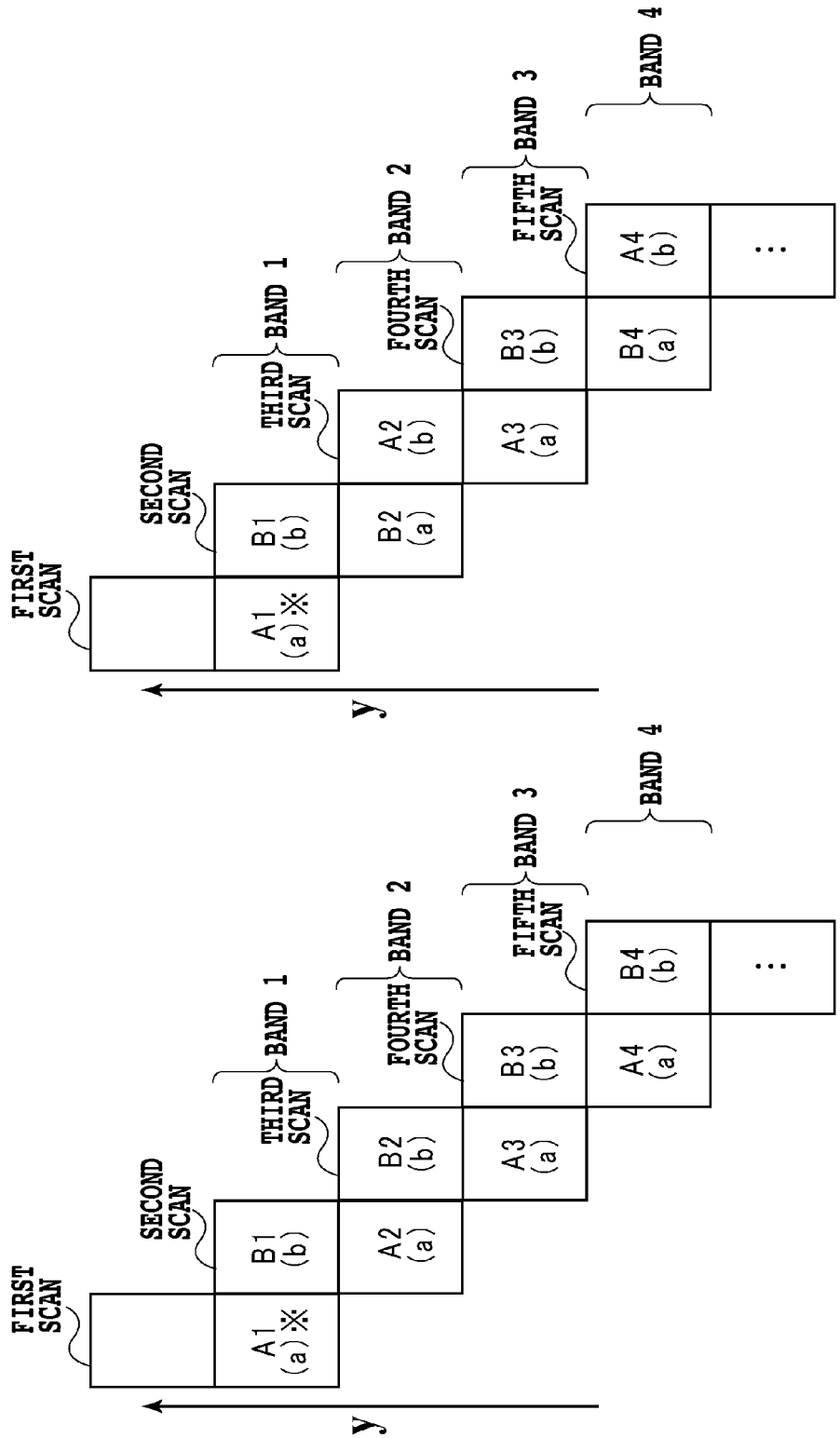

IMAGE PROCESSING APPARATUS AND IMAGE PROCESSING METHOD

BACKGROUND OF THE INVENTION

1. Field of the Invention

This invention relates to an image processing apparatus and an image processing method which process image data corresponding to the same region on a printing medium for printing an image in the same region by moving a printing unit (print head) relatively to the same region by a plurality of times.

2. Description of the Related Art

In a serial type inkjet printing apparatus, for the purpose of enhancing evenness of an image to be printed on a printing medium, a multi-pass printing method for performing a print in the same region on the printing medium by a plurality of times of scans by a print head is effectively used. Even in a case of adopting the multi-pass printing method, however, there are some cases where, due to a conveyance error of the printing medium or the like, there occurs a displacement in dot printing position between a preceding printing scan and a following printing scan and an image defect such as density unevenness may be introduced.

FIGS. 1A and 1B are diagrams each explaining the image defect upon performing a multi-pass print of two passes. In the figures, each black circle indicates a dot to be printed in a first printing scan and each white circle indicates a dot to be printed in a second printing scan. Conventionally in the multi-pass printing method, mask patterns having a completing relationship with each other are used to perform a print on the same region in a plurality of times of printing scans by the print head. Therefore, a dot arrangement as shown in FIG. 1A is obtained in the same region on the printing medium.

However, in a case where a dot group printed in the first printing scan is displaced from a dot group printed in the second printing scan due to some cause, the dot arrangement on the printing medium appears as shown in FIG. 1B. That is, the dot group printed in the first printing scan and the dot group printed in the second printing scan overlap with each other, so that blank sheet regions are exposed according to the overlap amount, thus lowering a coverage ratio of dots onto the printing medium, that is, an image density. In addition, when such a printing position displacement is suddenly generated due to a variation in conveyance amount of the printing medium, a speed variation of a carriage, a variation in distance between the printing medium and the print head (distance between a paper and the print head), or the like, there appears a region where the density in the corresponding region alone is low, which is recognized as density unevenness.

Japanese Patent Laid-Open No. 2000-103088 discloses, as a technology of reducing such an image defect, a method in which image data is distributed to correspond to different printing scans at a multi-value stage of the image data before binarization and each of the distributed multi-valued image data is binarized.

FIGS. 2A and 2B are diagrams each showing printing positions of dots upon performing a multi-pass print composed of two passes by using the method disclosed in Japanese Patent Laid-Open No. 2000-103088. In the figures, each black circle indicates a dot to be printed in a first printing scan, each white circle indicates a dot to be printed in a second printing scan, and each hatched circle indicates an overlap dot to be printed as a result of overlap by the first printing scan and the second printing scan. According to the method disclosed in Japanese Patent Laid-Open No. 2000-103088, since the multi-valued data is distributed to correspond to the printing scans, which is thereafter binarized independently from each other, the dot group printed in the first printing scan and the dot group printed in the second printing scan have no completing relationship. That is, there are some pixels where dots are printed in both of the first printing scan and the second printing scan, and on the other hand, there are some pixels where the dot is not printed in any of the first printing scan and the second printing scan.

According to such a dot arrangement, even if the dot group printed in the first printing scan is displaced from the dot group printed in the second printing scan, the coverage ratio of the dots onto the printing medium is not so much varied as shown in FIG. 2B. This is because, there newly appear some regions where dots printed in the first printing scan and dots printed in the second printing scan overlap, and meanwhile, in other regions where two dots are supposed to originally overlap, dots do not overlap.

However, such density variation due to the printing position displacement between the printing scans is not so much noticeable in low-density regions where the number of dots to be printed on the printing medium is originally small. This is because, in the low-density region, dots in both of the dot group printed in the first printing scan and the dot group printed in the second printing scan originally scatter in a small number, and even if these dot groups are displaced more or less, a distance of the dots between the dot groups is not so much small as the dots overlap with each other or are separated from each other. Instead, in the low-density region, there are some cases where, by adopting the method disclosed in Japanese Patent Laid-Open No. 2000-103088, a degree of dispersion of the dots is biased, raising a problem with graininess due to this bias.

For overcoming this problem, Japanese Patent Laid-Open No. 2009-246730 discloses a method in which, multi-valued image data is distributed into plural data corresponding to printing scans, and each of the distributed multi-valued image data is thereafter binarized in such a manner as to be exclusive with each other between the respective printing scans in regard to the low-density region. According to the method in Japanese Patent Laid-Open No. 2009-246730, it is possible to perform a multi-pass print which can restrict the graininess in the low-density region and at the same time, restrict the density unevenness due to the printing position displacement in the intermediate or high-density region.

Incidentally in recent years, under progress of a higher resolution in the printing apparatus, there is adopted a method of printing a plurality of dots in different positions within a pixel region to one pixel after quantization. Japanese Patent Laid-Open No. 2009-246730 also discloses a method in which each of multi-valued data distributed corresponding to two printing scans is quantized into any of 0, 1 or 2 and a dot pattern as shown in FIG. 3 in which the position and the number for printing dots are defined is made to be associated with any one of the levels for binarization. In a case of FIG. 3, for example, in a case where the level is 2 after quantization, one dot is printed in each of the opposing corner positions in 2×2 areas (positions in the top left and bottom right).

However, according to the method disclosed in Japanese Patent Laid-Open No. 2009-246730, since the constant dot pattern as shown in FIG. 3 is used to any of the printing scans, there are some cases where in the intermediate and high-density regions, lack of the density occurs and the density unevenness due to the printing position displacement can not be sufficiently avoided. The reason will be explained as follows.

In general, a size of a dot on the printing medium is designed to be associated with a printing resolution such that, in a case of printing dots on all the pixels corresponding to the printing resolution in the printing apparatus, blank sheet regions on the printing medium are sufficiently covered. As in the case of Japanese Patent Laid-Open No. 2009-246730, in a case where one pixel of the image process is expressed in tone to correspond to 2×2 printing resolution areas, one dot is printed in each of the 2×2 areas (FIG. 4A) to obtain the maximum density. However, in the construction where the multi-value data is distributed and each of the distributed data is then quantized, even if the multi-valued data before the distribution is a signal showing the maximum density (255), the multi-valued data corresponding to each printing scan is reduced to 50% (128). In addition, the multi-valued data is quantized to a tone value (level 2) where two dots respectively are printed in 2×2 areas. As a result, according to the dot pattern in FIG. 3, in the level 2 having the tone value equal in both of the first printing scan and the second printing scan, one dot is printed in each of the opposing corner positions in a region of 2×2 areas (positions in the top left and bottom right). That is, even in a case where a signal indicating the maximum density (255) is inputted in each of all the pixels in the same image region, the dot is printed not in all of the areas, and two dots are printed to overlap in every other area as shown in FIG. 4C. In this case, the number of dots to be printed on 2×2 areas is equal to that in a case where one dot is printed in each of the 2×2 areas, but blank sheet regions remain on the printing medium. That is, the density is lower as compared to a case where one dot is printed in each of the 2×2 areas.

In addition, in this state, when the printing position of the first printing scan is displaced from that of the second printing scan, the printing state of the dots occurs as shown in FIG. 4D, wherein the blank sheet region becomes smaller than that in a case of FIG. 4C. That is, according to the construction in Japanese Patent Laid-Open No. 2009-246730, the graininess in the low-density region can be reduced, but the density lack and the density unevenness in the intermediate and high-density regions can not be sufficiently restricted.

SUMMARY OF THE INVENTION

The present invention is made in view of the foregoing problems and an object of the present invention is to provide an image processing method which can output a uniform image having no graininess or density unevenness across all-tone regions from a low-density region to a high-density region in a case of tone-expressing one pixel corresponding to a plurality of areas.

In a first aspect of the present invention, there is provided an image processing apparatus executing an image process for printing an image on a printing medium by causing a print head which prints dots to scan relative to a same region on the printing medium M times comprising: a distribution unit configured to distribute multi-valued image data corresponding to the same region into M pieces to generate M pieces of multi-valued data; a quantization unit configured to quantize the M pieces of the multi-valued data respectively to generate M pieces of quantization data; and a binarization unit configured to, by referring to a dot pattern in which a print or a non-print of the dot onto each pixel corresponding to a print resolution is defined in accordance with a value of the quantization data, convert each of the M pieces of the quantization data into a binary data having the print resolution higher than that of the quantization data, wherein the dot patterns are prepared in such a manner as to be different from each other for the M pieces of the quantization data in at least one value.

In a second aspect of the present invention, there is provided an image processing apparatus executing an image process for printing an image on a printing medium by causing a print head which prints dots to scan relative to a same region on the printing medium M times comprising: a distribution unit configured to distribute multi-valued image data corresponding to the same region into N (>M) pieces to generate N pieces of multi-valued data; a quantization unit configured to quantize the N pieces of the multi-valued data respectively to generate N pieces of quantization data; a unit configured to add the N pieces of the quantization data to generate M pieces of quantization data; and a binarization unit configured to, by referring to a dot pattern in which a print or a non-print of the dot onto each pixel corresponding to a print resolution is defined in accordance with a value of the quantization data, convert each of the M pieces of the quantization data into a binary data having the print resolution higher than that of the quantization data, wherein the dot patterns are prepared in such a manner as to be different from each other for the M pieces of the quantization data.

In a third aspect of the present invention, there is provided an image processing apparatus executing an image process for printing an image on a printing medium by causing a print head which prints dots to scan relative to a same region on the printing medium M times comprising: a quantization unit configured to quantize multi-valued image data corresponding to the same region to generate quantization data; and a binarization unit configured to, by referring to M pieces of tables prepared corresponding to M time scans respectively, convert the quantization data into M pieces of binary data each having a resolution higher than that of the quantization data, wherein the table is composed of a parameter in which a print or a non-print of the dot onto each pixel corresponding to a print resolution is set in accordance with a value of the quantization data, and the M pieces of the tables are composed of parameters which are different from each other.

In a fourth aspect of the present invention, there is provided an image processing method for printing an image on a printing medium by causing a print head which prints dots to scan relative to a same region on the printing medium M times comprising: a distribution step for distributing multi-valued image data corresponding to the same region into M pieces to generate M pieces of multi-valued data; a quantization step for quantizing the M pieces of the multi-valued data respectively to generate M pieces of quantization data; and a binarization step for, by referring to a dot pattern in which a print or a non-print of the dot onto each pixel corresponding to a print resolution is defined in accordance with a value of the quantization data, converting each of the M pieces of the quantization data into a binary data having the print resolution higher than that of the quantization data, wherein the dot patterns are independently prepared in such a manner as to be different from each other for the M pieces of the quantization data.

In a fifth aspect of the present invention, there is provided an image processing method for printing an image on a printing medium by causing a print head which prints dots to scan relative to a same region on the printing medium M times comprising: a distribution step for distributing multi-valued image data corresponding to the same region into N (>M) pieces to generate N pieces of quantization data; a quantization step for quantizing the N pieces of the multi-valued data respectively to generate N pieces of quantization data; a step for adding the N pieces of the quantization data to generate M pieces of quantization data; and a binarization step for, by referring to a dot pattern in which a print or a non-print of the dot onto each pixel corresponding to a print resolution is defined in accordance with a value of the quantization data, converting each of the M pieces of the quantization data into a binary data having the print resolution higher than a resolution of the quantization data, wherein the dot patterns are independently prepared in such a manner as to be different from each other for the M pieces of the quantization data.

In a sixth aspect of the present invention, there is provided an image processing method for printing an image on a printing medium by causing a print head which prints dots to scan relative to a same region on the printing medium M times comprising: a quantization step for quantizing multi-valued image data corresponding to the same region to generate quantization data; and a binarization step for, by referring to M pieces of tables prepared corresponding to M times of the scans respectively, converting the quantization data into M pieces of binary data each having a resolution higher than that of the quantization data, wherein the table is composed of a parameter in which a print or a non-print of the dot onto each pixel corresponding to a print resolution is set in accordance with a value of the quantization data, and the M pieces of the tables are composed of parameters which are different from each other.

In a seventh aspect of the present invention, there is provided an image processing apparatus executing an image process for printing an image on a printing medium by causing a print head which prints dots to scan relative to a same region on the printing medium at least two times comprising: a generation unit configured to generate first multi-valued data for a first scan and second multi-valued data for a second scan based upon multi-valued image data corresponding to the same region; a quantization unit configured to quantize the first multi-valued data and the second multi-valued data respectively to generate first quantization data and second quantization data; and a binarization unit configured to use a dot pattern in which a print or a non-print of the dot onto each pixel corresponding to a print resolution is defined in accordance with a value of the quantization data for converting the first quantization data and the second quantization data into a first binary data and a second binary data, wherein the dot pattern for converting the first quantization data into the first binary data and the dot pattern for converting the second quantization data into the second binary data are different in at least one value.

Further features of the present invention will become apparent from the following description of exemplary embodiments with reference to the attached drawings.

BRIEF DESCRIPTION OF THE DRAWINGS

Figure 3:
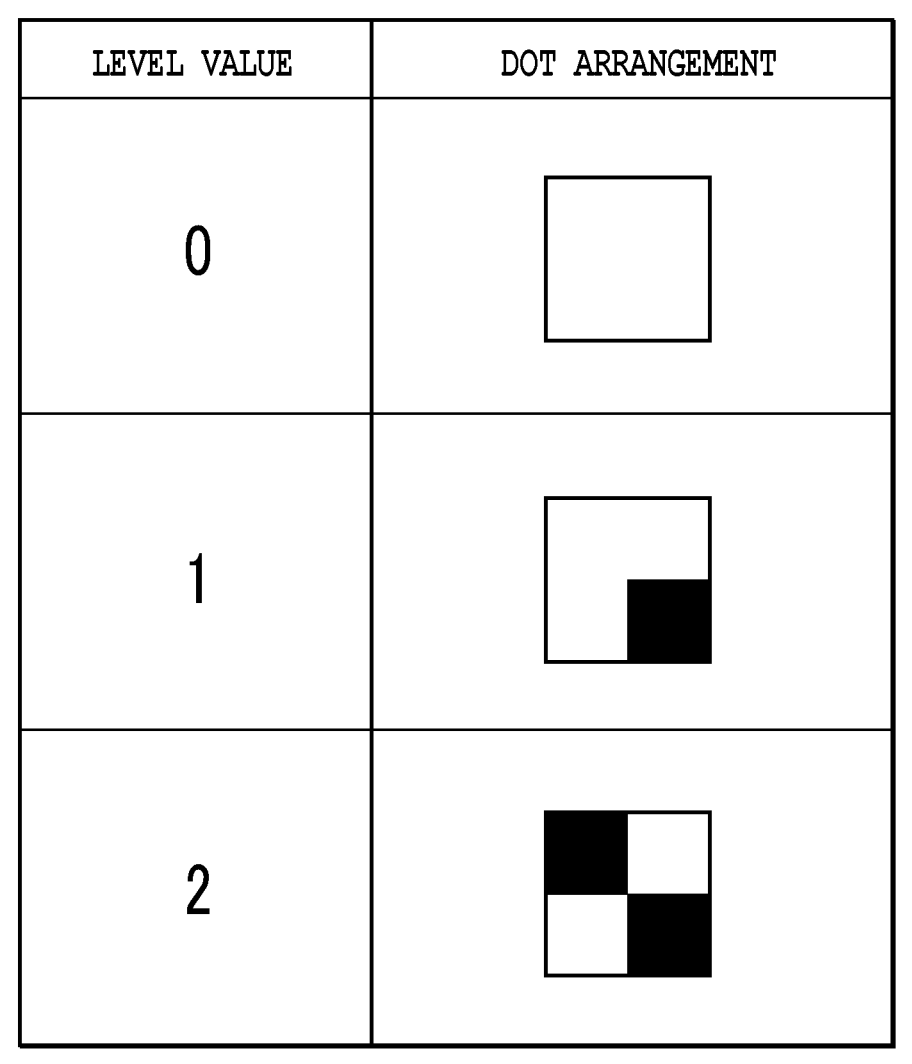

FIG. 3 is a diagram showing dot patterns described in Japanese Patent Laid-Open No. 2009-246730;

FIG. 9 is a diagram showing a level value of a pixel and a printing state of dots corresponding to it;

FIGS. 11A and 11B are diagrams showing printing states of dots for a first scan and a second scan onto the same region;

FIGS. 13A and 13B are diagrams showing printing states of dots for a first scan and a second scan onto the same region;

FIGS. 23A to 23C are diagrams showing states of data conversion in the fourth embodiment;

FIGS. 24A to 24C are diagrams showing different examples of data conversion in the fourth embodiment;

FIGS. 25A and 25B are diagrams explaining a printing method in a case of unifying the printing order of dot patterns to all the regions on the printing medium;

DESCRIPTION OF THE EMBODIMENTS

Figure 5:
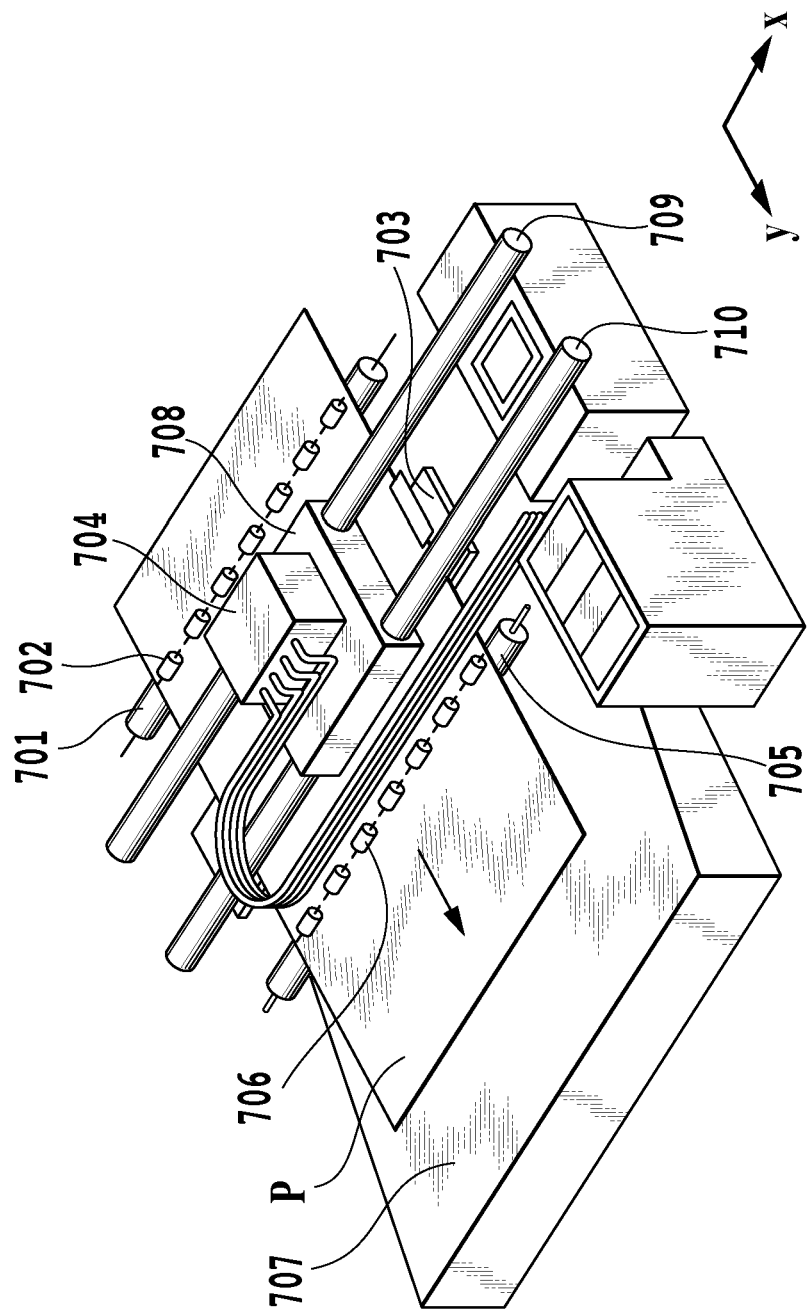
FIG. 5 is a perspective view showing an outline of a printing part in an inkjet printing apparatus in the present invention.

FIG. 5 is a perspective view showing an outline of a printing part of a printer engine unit in an inkjet printing apparatus of a serial type according to an embodiment in the present invention. A printing medium P is guided and supported on a platen 703 and conveyed in the y direction in the figure (sub scan direction) by rotation of a conveyance roller 701. Pinch rollers 702 are urged resiliently against the conveyance roller 701 by a pressing unit such as a spring (not shown). These conveyance roller 701 and pinch rollers 702 constitute components of a first conveyance unit in the upstream side in the printing medium conveyance direction.

The platen 703 is provided in a printing position opposing a face (ejection face) in which ejection openings of a print head 704 in the form of an inkjet are formed and supports the backside of the printing medium P, thus maintaining a distance between a surface of the printing medium and the ejection face of the print head 704 to be constant. The printing medium P which is conveyed on the platen 703 and on which a print is performed is sandwiched between a rotating discharge roller 705 and rotating spurs 706 driven by the discharge roller 705 and is conveyed in the Y direction to be discharged from the platen 703 to a discharge tray 707. The discharge roller 705 and the spurs 706 constitute components of a second conveyance unit at the downstream side in the printing medium conveyance direction.

The print head 704 is removably mounted on a carriage 708 in a posture in which the ejection opening face is positioned as opposed to the platen 703 or the printing medium P. The carriage 708 is reciprocally moved along two guide rails 709 and 710 by a driving force of a carriage motor E0001, and the printing head 704 performs an ink ejection operation in response to a printing signal in the process of a relative movement of the carriage 708 to the printing medium. The direction where the carriage 708 moves is an x direction intersecting with the Y direction where the printing medium is conveyed and is called a main scan direction. The movement in the main scan direction of the carriage 708 and the print head 704 (movement accompanied by printing) and the conveyance of the printing medium are alternately repeated to perform a print on the printing medium P.

Figures 6A, 6B:
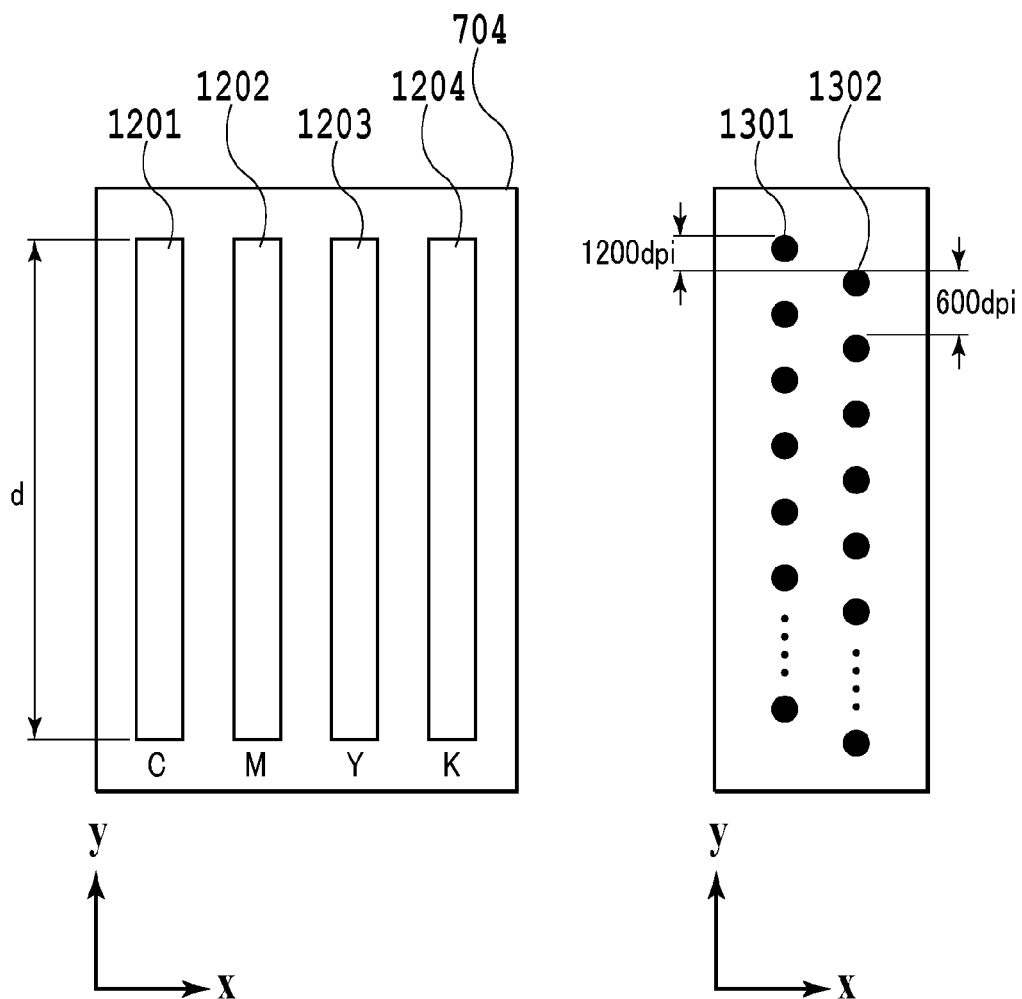
FIGS. 6A and 6B are diagrams shown by observing a print head from a side of an ejection opening face.

FIGS. 6A and 6B are schematic diagrams in a case of observing the print head 704 from the ejection opening formation face. In the figures, 1201 indicates a cyan nozzle line (printing element group), 1202 indicates a magenta nozzle line, 1203 indicates a yellow nozzle line, and 1204 indicates a black nozzle line. A width of each nozzle line in the y direction is indicated at d, and a print corresponding to the width d is possible by one time of the scan.

Since the printing apparatus in the present embodiment performs a multi-pass printing, an image is step by step formed by a plurality of times of printing scans on a region where the print head 704 can perform a print by one time of the scan. At this time, by performing a conveyance movement of the printing medium by an amount smaller than the width d of the print head 704 between the respective printing scans, density unevenness or a stripe due to variations of individual nozzles can be further reduced.

FIG. 6B shows an arrangement diagram of ejection openings in the nozzle line 1201 of one color. The nozzle line 1201 is constructed such that two lines composed of ejection opening lines 1301 and 1302 are arranged in parallel in the x direction. Each of the ejection opening lines has 256 ejection openings arranged in the y direction respectively by a pitch of 600 dpi, each ejection opening ejecting an ink droplet of approximately 2 pl. The two lines composed of the ejection opening lines are arranged in such a manner that individual ejection openings of the one are displaced by half a pitch in the y direction from those of the other. According to such a construction, dots can be printed on the printing medium with a resolution of 1200 dpi in the y direction by one time of the printing scan of the print head. Each of the nozzle lines 1202 to 1204 has the same construction as that of the nozzle line 1201.

Figure 7:
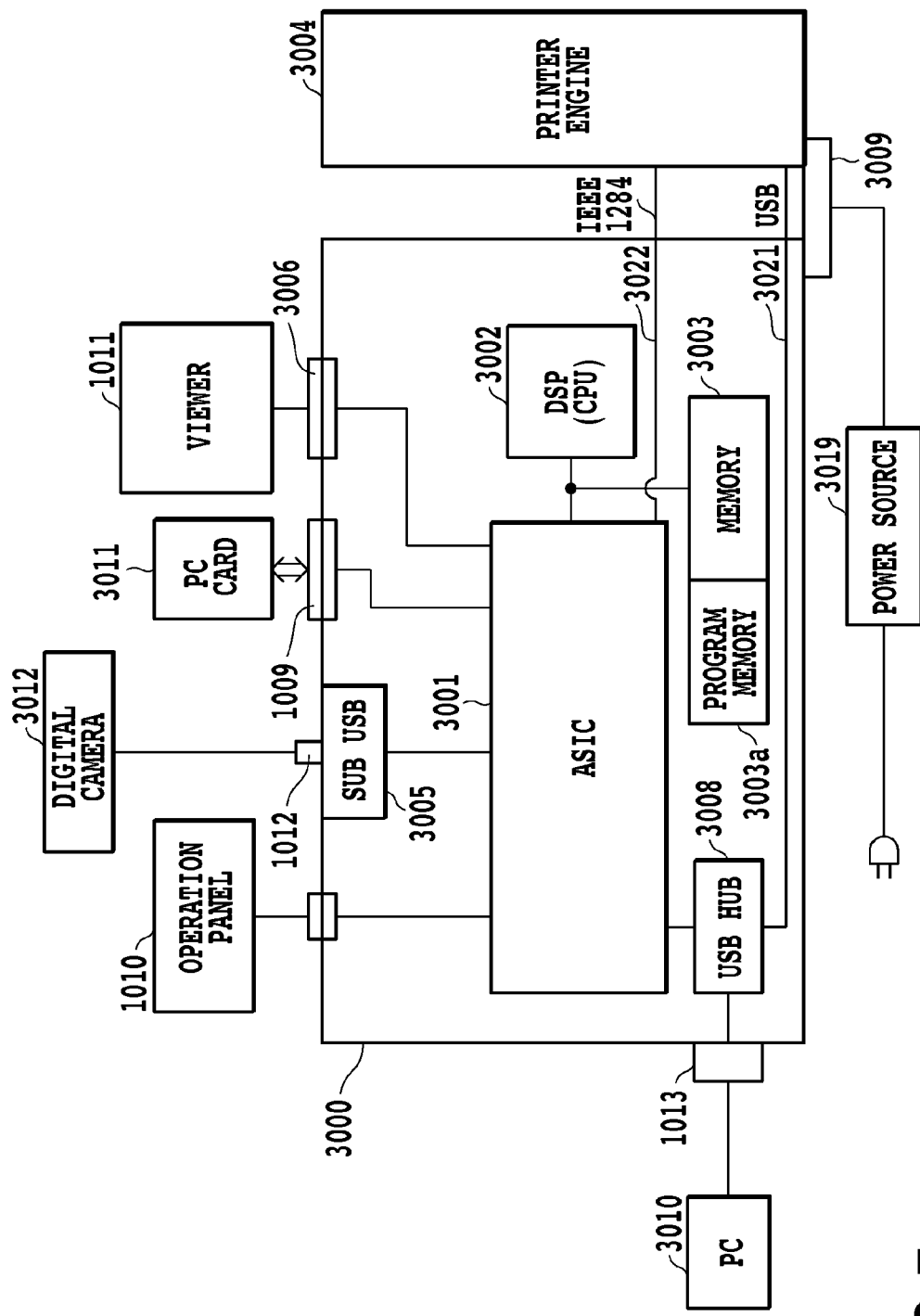
FIG. 7 is a block diagram showing the construction of a major part relating to control in the printing apparatus.

FIG. 7 is a block diagram showing the construction of a major part according to control of the printing apparatus in the present embodiment. In the figure, at 3000 is indicated a control unit (control substrate), and at 3001 is indicated an image process ASIC (exclusive custom LSI). At 3002 is indicated a DSP (digital signal processing processor) which includes a CPU therein serving to control various control processes, various image processes and the like to be described later. At 3003 is indicated a memory including a program memory 3003a for storing control programs in the CPU of the DPS 3002, a RAM area for storing programs at execution, and a memory area functioning as a work area for storing image data and the like. Dot patterns and table parameters which are the feature part in the present invention to be explained hereinafter are in advance stored in the memory 3003. At 3004 is indicated a printer engine which is here a printer engine of an inkjet printer for printing a color image using a plurality of color inks. At 3005 is indicated a USB connector as a port for connecting a digital camera (DSC) 3012. At 3006 is indicated a connector for connecting a viewer 1011. At 3008 is indicated a USB hub, which, at the time the printing apparatus performs a print based upon image data from a PC 3010, transmits data from the PC 3010 as it is, which is outputted via a USB 3021 to the printer engine 3004. In consequence, the PC 3010 connected to the printer engine 3004 can make a direct exchange of data or signals with the printer engine 3004 to perform a print (functions as a general PC printer). At 3009 is indicated a power source connector to which direct current voltage converted from commercial AC is inputted from a power source 3019. The PC 3010 is a general personal computer, at 3011 is indicated a memory card (PC card), and at 3012 is indicated a digital camera (DSC). The transmitting of signals between the control unit 3000 and the printer engine 3004 is made via the USB 3021 described above or an IEEE 1284 and a bus 3022.

First Embodiment

Figure 8:
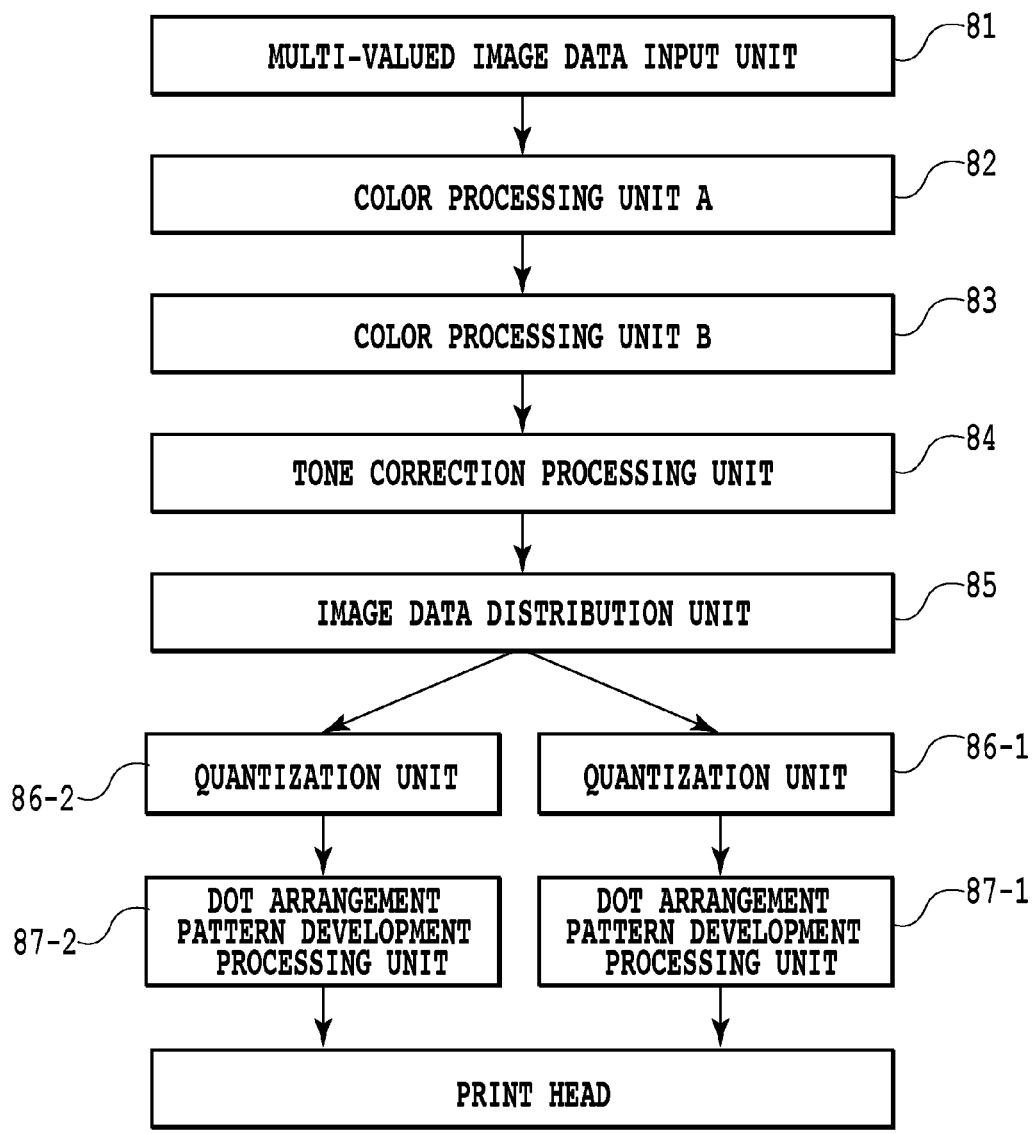
FIG. 8 is a block diagram explaining an image process in a first embodiment.

FIG. 8 is a block diagram explaining the image process executed by the control unit 3000 at multi-pass printing of two passes in a first embodiment. The processes shown hereinafter are executed using various parameters stored in the memory 3003 according to programs stored in the program memory 3003a by the control unit 3000.

Multi-valued image data (256 values) of RGB of 600 dpi is inputted via a multi-valued image data input unit 81 from an external device such as the PC 3010. To the input image data (multi-valued RGB data), a color space conversion process from a color space of an original image to a color space which can be expressed in the printing apparatus is first executed in a color processing unit A 82. As a result, the RGB data of 256 values in each pixel is converted into R'G'B' of 256 values likewise. In a subsequent color processing unit B 83, the R'G'B' are converted into four sets of multi-valued image data (CMYK) corresponding to ink colors (CMYK) used in the printing apparatus. A three-dimensional lookup table (LUT) in which input signals of 256 values and output signals of 256 values are associated by one to one is prepared in each of the color processing unit A 82 and the color processing unit B 83. By using the LUT, three sets of multi-valued data are converted into four sets of multi-valued data all together in the color processing unit B 83. In a case of a small size of a table which does not have lattice points corresponding to all the input signals of 256 values, as to an input value out of the table lattice point value, an output value may be calculated by interpolation of output values of the nearby lattice points. The following processes will be executed independently and in parallel in each of CYMK.

In a tone correction processing unit 84, input signal values (CMYK) are corrected to be converted into signal values (C'M'Y'K') of 256 values in such a manner that an actual density expressed on the printing medium has linearity to multi-valued signal values to be inputted thereto.

In an image data distribution unit 85, the multi-valued data of 256 values (C'M'Y'K') are distributed into multi-valued data (C1, M1, Y1 and K1) for a first scan and multi-valued data (C2, M2, Y2 and K2) for a second scan. In the present embodiment, the distribution at this time is substantially equally made.

The multi-valued data (C1, M1, Y1 and K1) for the first scan generated in the image data distribution unit 85 is subjected to a quantization process in a quantization processing unit 86-1 for a first scan to be converted into quantization data of any of 0 (non-print) or 1 (print). In addition, the multi-valued data (C2, M2, Y2 and K2) for the second scan generated in the image data distribution unit 85 is subjected to a quantization process in a quantization processing unit 86-2 for a second scan to be converted into quantization data of any of 0 (non-print) or 1 (print). At this time, the non-print (0) means a state where even one dot is not printed in a pixel region of 600 dpi in the scan. Meanwhile, the print (1) means a state where one dot is printed in the pixel region of 600 dpi in the scan. In this manner, two kinds of the multi-valued data for each color respectively are quantized to generate 8 kinds of quantization data (binary data) corresponding to four colors. In the present embodiment, the quantization method adopted in these quantization processing units will be a general error diffusion method. In this case, in order that a pixel where a dot is printed by twice of scans and a pixel where a dot is printed only by one time of the scan are mixed in an appropriate degree in the quantization processing unit to the same ink, a different dispersion matrix may be adopted.

A dot arrangement pattern development processing unit 87-1 for a first scan refers to a dot pattern for a first scan in advance prepared to convert the binary data of 600 dpi×600 dpi for the first scan into binary data of 600 dpi in the x direction×1200 dpi in the y direction. A dot arrangement pattern development processing unit 87-2 for a second scan refers to a dot pattern for a second scan in advance prepared to convert the binary data of 600 dpi×600 dpi for the second scan into binary data of 600 dpi in the x direction×1200 dpi in the y direction. In the present embodiment, the resolution thus doubles only in the y direction (sub scan direction).

FIG. 9 is diagrams showing a binary level value of a pixel of 600 dpi×600 dpi and a printing state of a dot to a pixel of 600 dpi×1200 dpi corresponding to it. A black circle shows a pixel of 600 dpi×1200 dpi in which one dot is printed. A region of one pixel of 600 dpi×600 dpi corresponds to a pixel region corresponding to two pixels having a size of two pixels in the y direction×one pixel in the x direction in a region of 600 dpi×1200 dpi. Therefore, when a level value of 600 dpi×600 dpi is 1, a position of printing a dot exists in two ways as shown in the figures.

In the present embodiment, the dot pattern is a pattern in which the print or the non-print of the dot to each pixel of 600 dpi×1200 dpi is defined in a wider pixel region (corresponding to 16 pixels of 600 dpi×600 dpi).

Figure 10A:
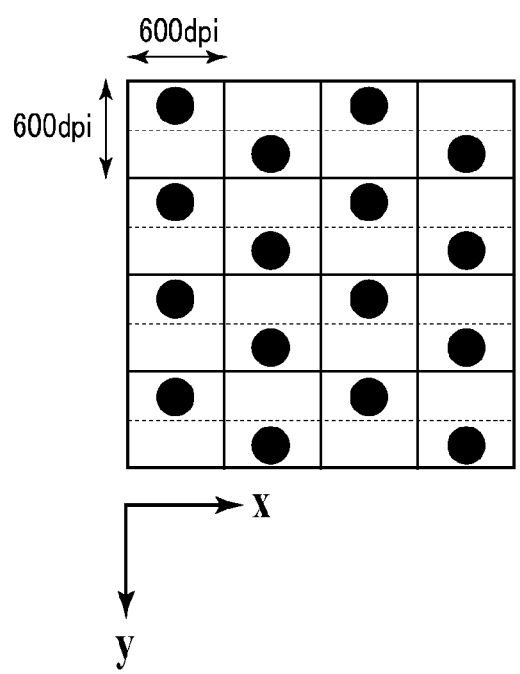
FIGS. 10A and 10B are diagrams showing dot patterns for a first scan and a second scan.
Figure 10B:
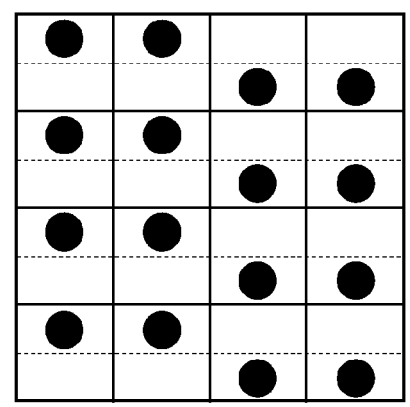

FIGS. 10A and 10B are diagrams each showing a dot pattern for a first scan (FIG. 10A) and a dot pattern for a second scan (FIG. 10B) to level 1 in the present embodiment. Each lattice shows a one-pixel region corresponding to 600 dpi×600 dpi. Any of the dot patterns prepares a region corresponding to 16 pixels=four pixels×four pixels each having 600 dpi×600 dpi. As to the dot pattern for the first scan, two kinds of patterns are alternately arranged for every other pixel in the x direction. Meanwhile, as to the dot pattern for the second scan, two kinds of patterns are alternately arranged for every two pixels in the x direction. Therefore, dots at the half of the dot positions indicated by the dot pattern for the first scan are adapted to overlap over dots in the dot pattern for the second scan. In the present embodiment, the dot pattern for the first scan thus differs in the arrangement state from the dot patter for the second scan. These dot patterns are in advance stored in the memory 3003 in the printing apparatus body.

By referring back to FIG. 8, the binary data of 600 dpi×1200 dpi outputted from the dot arrangement pattern development processing units 87-1 and 87-2 is transmitted to the printing head of each color, through which ejection is carried out at the corresponding printing scan.

Here, for example, there will be reviewed a case where the binary data after the quantization processing unit 86-1 for the first scan has uniformly level 1 and the binary data after the quantization processing unit 86-2 onto the same region has uniformly level 1. In this case, the dot pattern shown in FIG. 10A is printed in the first scan and the dot pattern shown in FIG. 10B is printed in the second scan.

FIGS. 11A and 11B are diagrams showing printing states of dots on the printing medium in a case where the binary data after the quantization processes for the first scan and the second scan each has uniformly level 1. In both of the figures, a black circle indicates a dot printed in the first scan, a white circle indicates a dot printed in the second scan, and a hatched circle indicates an overlap dot printed in the first scan and the second scan. Each lattice indicates a one-pixel region corresponding to 600 dpi×600 dpi, and each dot has a diameter of approximately 40 µm. FIG. 11A shows a state where there occurs no printing position displacement between the dot group printed in the first scan and the dot group printed in the second scan, and FIG. 11B shows a case where there occurs a printing position displacement in the order of 20 µm in the y direction.

In FIG. 11A where there occurs no printing position displacement, dots are arranged in each scan according to FIG. 10A and FIG. 10B. On the other hand, in FIG. 11B where there occurs the printing position displacement, overlap dots shown in hatched lines in FIG. 11A are separated, and the dot (black circle) in the first scan and the dot (white circle) in the second scan, which have been separated with each other in FIG. 11A, overlap. In addition, due to the printing position displacement in this manner, the number of the separated dots is equal to that of the overlap dots. As a result, by comparing both figures, an area for covering the printing medium does not almost change between a case (FIG. 11A) where there occurs no printing position displacement and a case (FIG. 11B) where there occurs the printing position displacement. That is, according to the present embodiment, by applying the different dot patterns as shown in FIG. 10A and FIG. 10B to each of the first printing scan and the second printing scan, it is possible to output an image where the density unevenness due to the printing position displacement is not invited.

In the above embodiment, the dot patterns shown in FIG. 10A and FIG. 10B are used as the first scan and the second scan, but the present embodiment is not limited to these dot patterns. As long as the dot pattern is formed in such a manner that the coverage area onto the printing medium is kept to be substantially constant regardless of the printing position displacement, such a dot pattern can be used effectively.

Figure 12A:
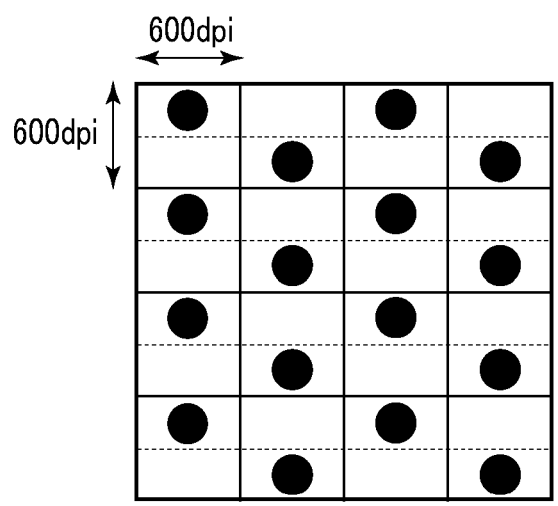
FIGS. 12A and 12B are diagrams showing different examples of dot patterns for a first scan and a second scan.
Figure 12B:
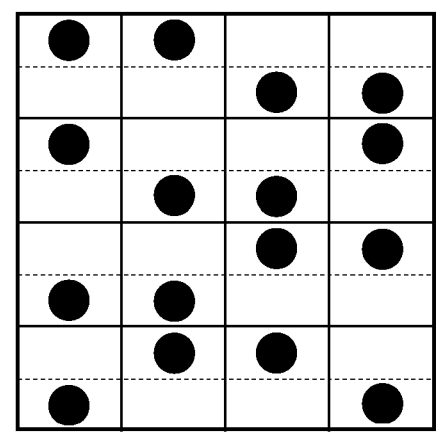

FIGS. 12A and 12B are diagrams showing another example of a dot pattern for a first scan and a dot pattern for a second scan to level 1 which can be adopted in the present embodiment as similar to FIGS. 10A and 10B. In addition, FIGS. 13A and 13B are diagrams showing printing states of dots on the print medium in a case of using the dot patterns shown in FIGS. 12A and 12B as similar to FIGS. 11A and 11B. As seen from FIGS. 13A and 13B, also in this example, an area for covering the printing medium does not almost change between a case (FIG. 13A) where there occurs no printing position displacement and a case (FIG. 13B) where there occurs the printing position displacement. That is, also by applying the different dot patterns as shown in FIG. 12A and FIG. 12B to each of the first printing scan and the second printing scan, it is possible to output an image where the density unevenness due to the printing position displacement is not invited.

It should be noted that, in the present embodiment, there is shown an example where the quantization processing units 86-1 and 86-2 generate the binary quantization data from the multi-valued data for the first scan and the multi-valued data for the second scan each, but the quantization processing units 86-1 and 86-2 may generate three-valued or more-valued quantization data. At this time, in the dot arrangement development processing units 87-1 and 87-2, it is necessary to use the dot pattern where the coverage area is kept to be substantially constant regardless of the printing position displacement between the first scan and the second scan in not all the level values (in a case of four values, level 1, level 2, and level 3) except for level 0. That is, at least in one level value, it may be required to use the dot pattern where the coverage area is kept to be substantially constant regardless of the printing position displacement between the first scan and the second scan. Since an impact of the density unevenness due to the printing position displacement becomes large in the intermediate region, particularly in the intermediate density region (for example, level 2 in a case of four-valued data), it is thought that it is preferable to use the dot pattern where the coverage area is kept to be substantially constant regardless of the printing position displacement between the first scan and the second scan.

In addition, the present embodiment shows an example of the two-pass print, but it goes without saying that the construction in the present embodiment may be applied to a multi-pass printing (M-pass printing) of three or more passes. At this time, it is not necessary that dot patterns of the respective passes (respective printing scans) of the multi-pass print of three or more passes differ. The present embodiment may be constructed such that among M times of printing scans, the first multi-valued data and the second multi-valued data corresponding to at least two times of printing scans (first printing scan and second printing scan) are quantized into first quantization data and second quantization data, and the dot patterns corresponding to them are different. In addition, the present embodiment may be constructed such that the first quantization data and the second quantization data are converted into first binary data and second binary data by referring to the respective dot patterns, and as a result, at least in one of the level values, different dot patterns are printed on the printing medium.

Second Embodiment

Figure 14:
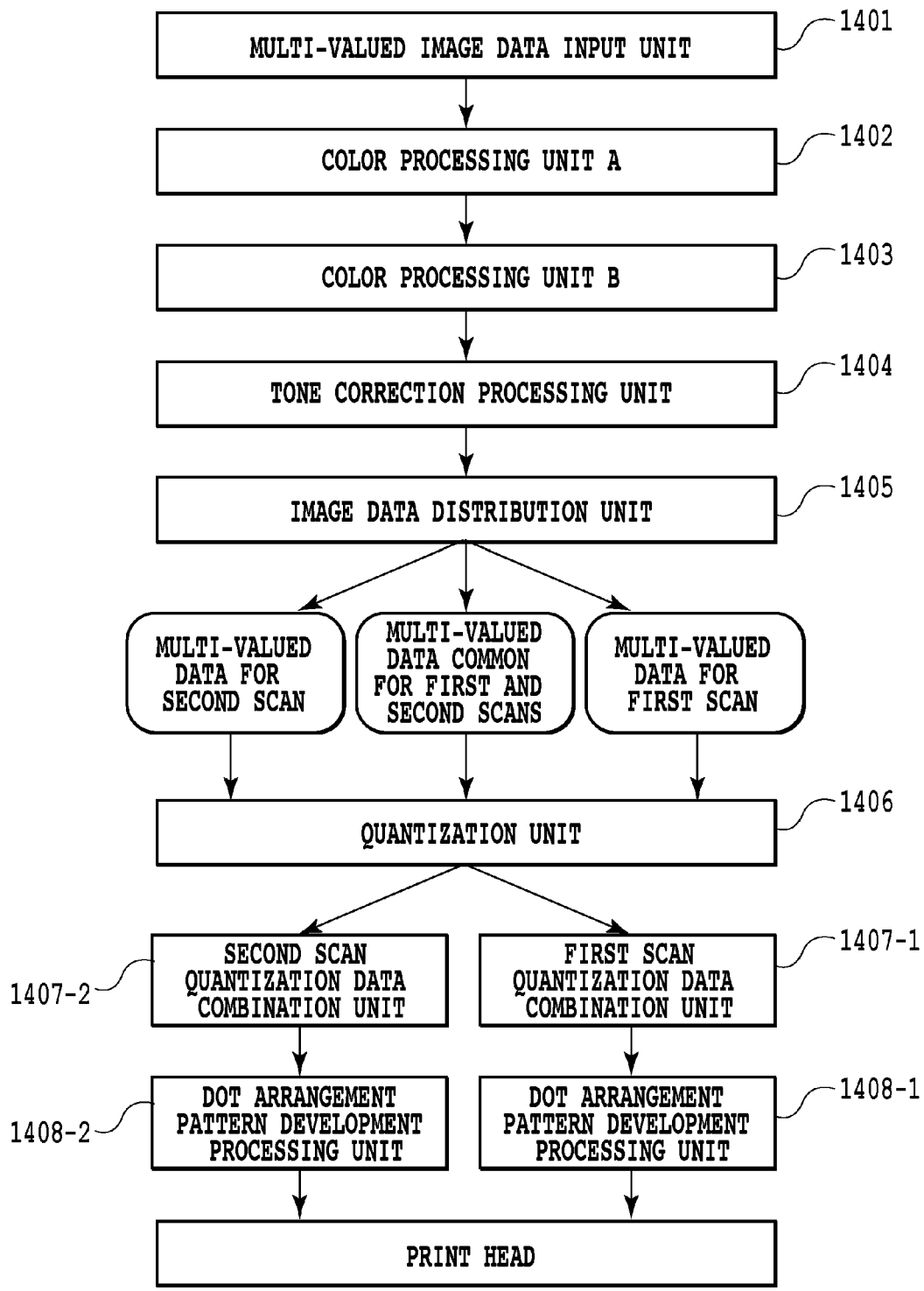
FIG. 14 is a block diagram explaining an image process in a second embodiment.

FIG. 14 is a block diagram explaining an image process in a case of performing a multi-pass printing of two passes in a second embodiment. Since the processes from a multi-valued image data input unit 1401 to a tone correction processing unit 1404 are the same as those in the first embodiment, the explanation is omitted.

An image data distribution unit 1405 in the present embodiment distributes multi-valued data (C'M'Y'K') as three data of multi-valued data for a first scan (C1, M1, Y1 and K1), multi-valued data for a second scan (C2, M2, Y2 and K2), and multi-valued data common for the first and second scans (C3, M3, Y3 and K3). The distribution at this time may be equally divided into three data, but may not be necessarily equally divided. However, for example, as the distribution will be explained by taking cyan as an example, when the multi-valued data C' before the distribution is distributed as the multi-valued data C1 for the first scan, the multi-valued data C2 for the second scan and the multi-valued data C3 common for the first and second scans, it is preferable to meet an equation of C1+C2+2C3=C'. This is because of preserving an image density outputted to an input value. However, for example, in a case of desiring to increase a density of an output image to be higher, an equation of C1+C2+2C3>C' may be used.

The multi-valued data for the first scan (C1, M1, Y1 and K1), the multi-valued data for the second scan (C2, M2, Y2 and K2), and the multi-valued data common for the first and second scans (C3, M3, Y3 and K3) distributed in an image data distribution unit 1405 respectively are inputted to a quantization processing unit 1406. In the quantization processing unit 1406 in the present embodiment, a quantization process by an error diffusion method is executed to each of the multi-valued data in such a manner that binary data for a first scan, binary data for a second scan, and binary data common for the first and second scans are exclusive with each other. "Being exclusive with each other" means that the process is executed in such a manner that C1, C2 and C3 do not have 1 (print) in the same pixel. By these quantization processes, the quantization processing unit 1406 outputs the binary data for the first scan (quantization data), the binary data for the second scan (quantization data), and the binary data common for the first and second scans (quantization data) which are in the exclusive relation with each other.

Thereafter, the binary data for the first scan and the binary data common for the first and second scans are inputted to a first scan quantization data combination unit 1407-1 to be added (logical sum). In addition, the binary data for the second scan and the binary data common for the first and second scans are inputted to a second scan quantization data combination unit 1407-2 to be added (logical sum). Two binary data obtained thus have the same value (print) with each other in the pixels having 1 (print) in the binary data common for the first and second scans, but have the exclusive relation with each other in the other pixels.

Thereafter, the binary data outputted from the first scan quantization combination unit 1407-1 is inputted to a dot arrangement pattern development processing unit 1408-1, and, by referring to a dot pattern for a first scan, is converted into binary data of 600 dpi×1200 dpi. In addition, the binary data outputted from the second scan quantization data combination unit 1407-2 is inputted to a dot arrangement pattern development processing unit 1408-2, and, by referring to a dot pattern for a second scan, is converted into binary data of 600 dpi×1200 dpi. In regard to the dot patterns to be referred to at this time, those in FIGS. 10A and 10B or FIGS. 12A and 12B can be used.

Each of the binary data of 600 dpi×1200 dpi outputted from the dot arrangement pattern development processing units 1408-1 and 1408-2 is transmitted to the print head of each color, through which ejection is carried out at the corresponding printing scan.

According to the present embodiment, a ratio of distributing the multi-valued data to the multi-valued data common for the first and second scans in the image data distribution unit 1405 amounts to a ratio of pixels where overlap dots in a unit of 600 dpi×600 dpi are printed. That is, it is possible to control the ratio of the overlap dots on some degree by adjusting the ratio of distributing the multi-valued data to the multi-valued data common for the first and second scans in the image data distribution unit 1405.

Figure 1A:
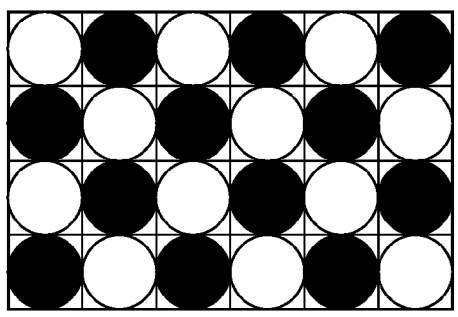
FIGS. 1A and 1B are schematic diagrams explaining an image defect in a two-pass print.
Figure 1B:
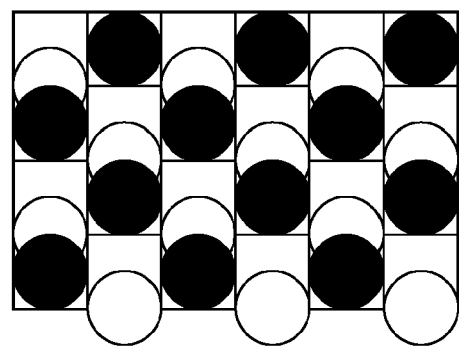
Figure 2A:
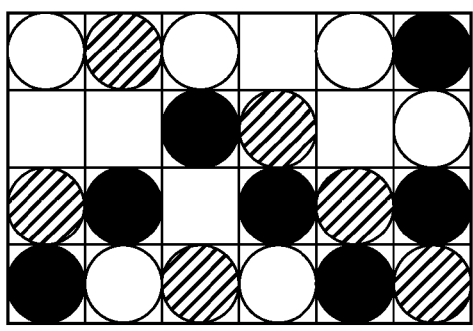
FIGS. 2A and 2B are schematic diagrams showing printing positions of dots in Japanese Patent Laid-Open No. 2000-103088.
Figure 2B:
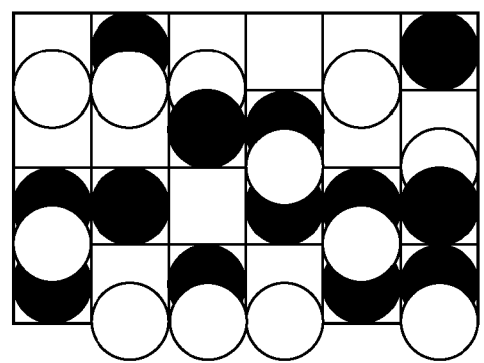
Figure 4A:
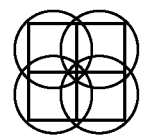
FIGS. 4A to 4D are diagrams each explaining a relation between printing positions and a coverage ratio of dots.
Figure 4B:
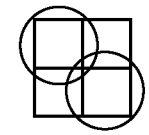
Figure 4C:
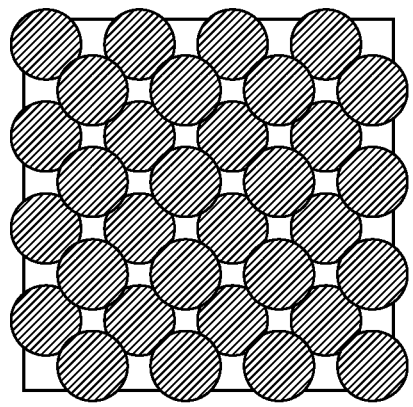
Figure 4D:
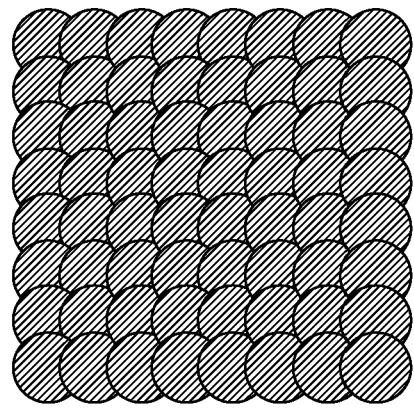
Figure 15A:
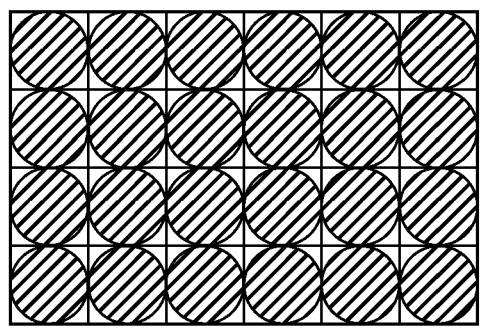
FIGS. 15A and 15B are diagrams showing overlap dots at a printing position displacement.
Figure 15B:
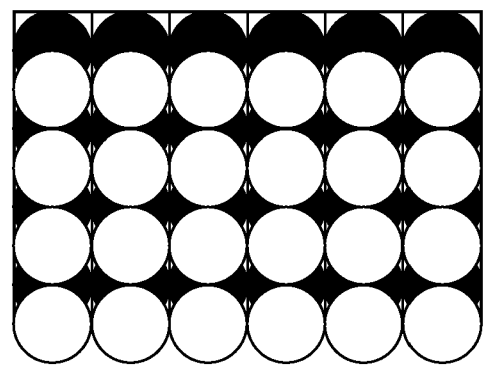

In general, a variation in density due to the printing position displacement becomes under the influence of the number or ratio of overlap dots in advance prepared. For example, in a case where the overlap dots are not in advance prepared at all, the image density is lowered as explained in FIGS. 1A and 1B. However, for example, in a case where the printing position displacement occurs in a state where all the dots are composed of the overlap dots as shown in FIG. 15A, the coverage area increases and the image density rises as shown in FIG. 15B. In this manner, the variation in density due to the printing position displacement becomes under the influence of the number or ratio of the overlap dots in advance prepared. According to the present embodiment, it is possible to adjust the number of the overlap dots according to the degree of the density unevenness occurring due to the printing position displacement, and it is possible to restrict the density unevenness due to the printing position displacement more actively in addition to the first embodiment.

Third Embodiment

Figure 16:
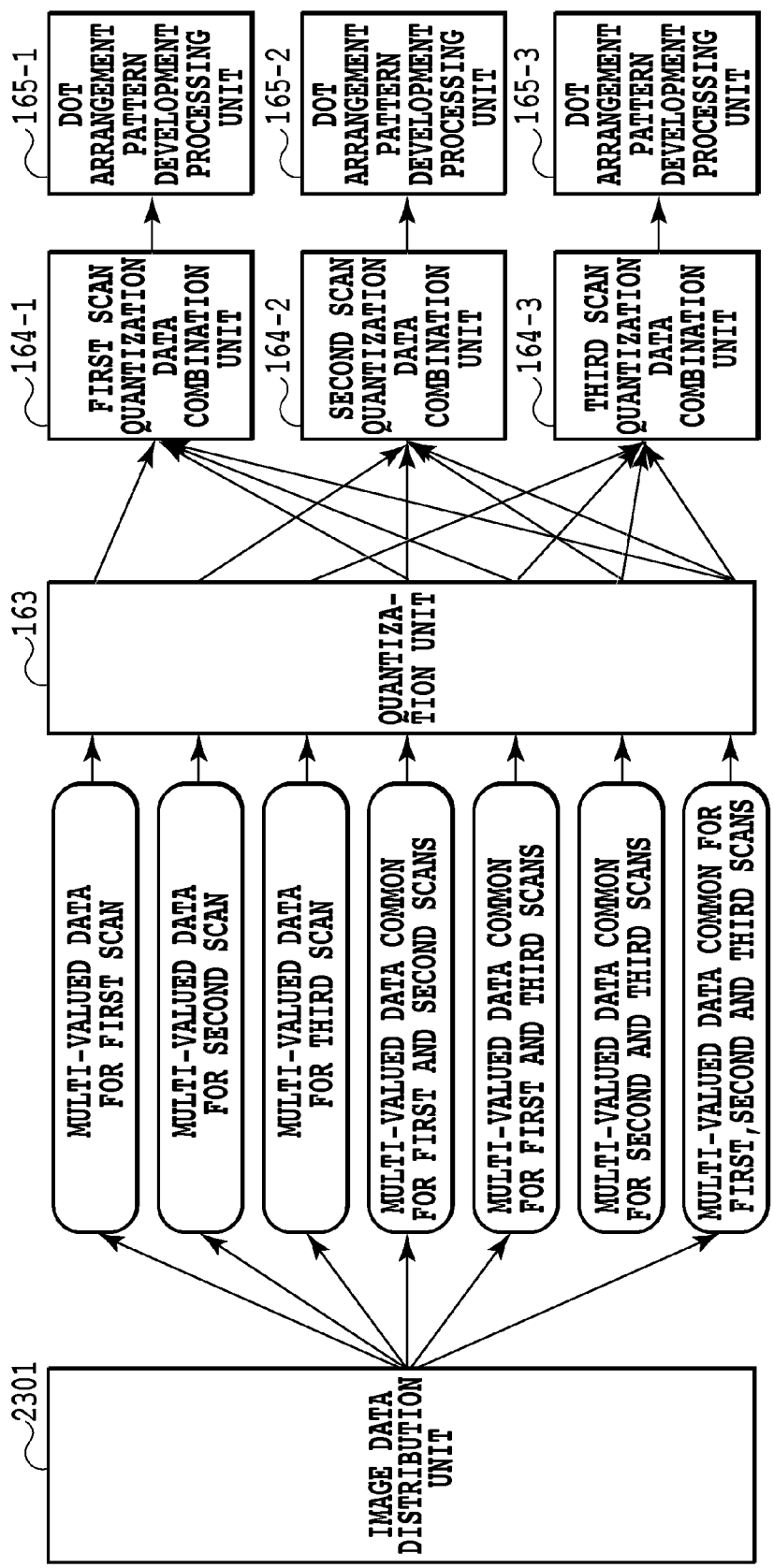
FIG. 16 is a block diagram explaining an image process in a third embodiment.

FIG. 16 is a block diagram explaining an image process in a case of performing a multi-pass printing of three passes in a third embodiment. Since the processes from a multi-valued image data input unit to a tone correction processing unit are the same as those in the above embodiment, the block is herein omitted.

An image data distribution unit 2301 in the present embodiment distributes the multi-valued data to be inputted, into seven data. As a result, multi-valued data for a first scan, multi-valued data for a second scan, multi-valued data for a third scan, multi-valued data common for the first and second scans, multi-valued data common for the first and third scans, multi-valued data common for the second and third scans, and multi-valued data common for the first, second and third scans are generated. The distribution at this time may be made to equally divide the multi-valued data into the seven data, but the multi-valued data may not be necessarily equally distributed. The multi-value data may be distributed in such a manner as to appropriately adjust the image density outputted corresponding to the input value as in the case of the second embodiment.

The seven multi-valued data distributed in the image data distribution unit 2301 each are subjected to a quantization process by an error diffusion method in such a manner as to be exclusive with each other. Thereafter, binary data for a first scan, binary data common for first and second scans, binary data common for the first and third scans, and binary data common for the first, second and third scans are inputted to a first scan quantization data combination unit 164-1 to be added (logical sum). In addition, binary data for a second scan, binary data common for first and second scans, binary data common for second and third scans, and binary data common for first, second and third scans are inputted to a second scan quantization data combination unit 164-2 to be added (logical sum). Further, binary data for a third scan, binary data common for first and third scans, binary data common for second and third scans, and binary data common for first, second and third scans are inputted to a third scan quantization data combination unit 164-3 to be added (logical sum).

Thereafter, the binary data outputted from the first scan quantization combination unit 164-1 is inputted to a dot arrangement pattern development processing unit 165-1, and, by referring to a dot pattern for a first scan, is converted into binary data of 600 dpi×1200 dpi. In addition, the binary data outputted from the second scan quantization data combination unit 164-2 is inputted to a dot arrangement pattern development processing unit 165-2, and by referring to a dot pattern for a second scan, is converted into binary data of 600 dpi×1200 dpi. Further, the binary data outputted from the third scan quantization data combination unit 164-3 is inputted to a dot arrangement pattern development processing unit 165-3, and by referring to the dot pattern for the third scan, is converted into binary data of 600 dpi×1200 dpi.

Figure 17C:
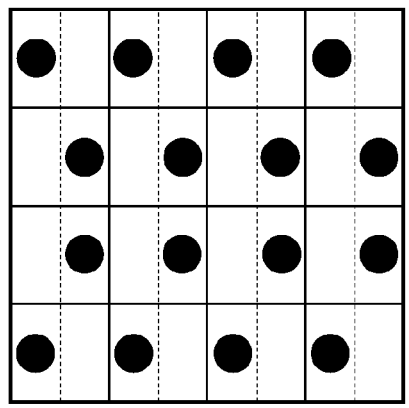
FIGS. 17A to 17C are diagrams each showing a dot pattern for each of a first scan, a second scan and a third scan in the third embodiment.
Figure 17B:
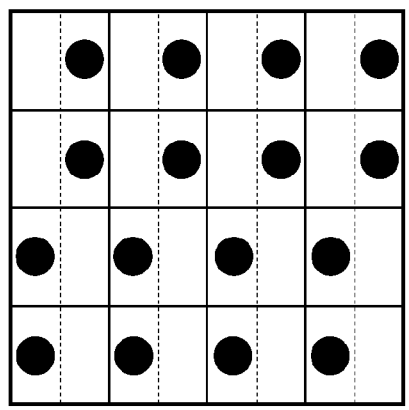
Figure 17A:
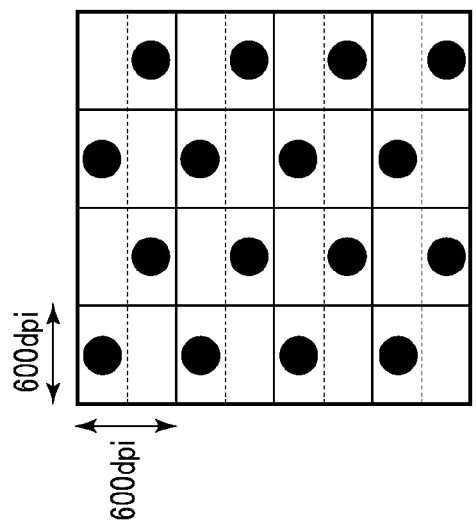

FIGS. 17A to 17C are diagrams each showing a dot pattern for a first scan (FIG. 17A), a dot pattern for a second scan (FIG. 17B), and a dot pattern for a third scan (FIG. 17C) to level 1 in the present embodiment. As to the dot pattern for the first scan, two kinds of patterns are alternately arranged for every other pixel in the x direction. As to the dot pattern for the second scan, two kinds of patterns are alternately arranged for every two pixels in the x direction. As to the dot pattern for the third scan, two kinds of patterns are alternately arranged for every two pixels in the x direction in the same way as the dot pattern for the second scan, but the phase is displaced by half a cycle. In this manner, in the present embodiment, the dot patterns for the first to third scans differ in the arrangement state.

Figure 18A:
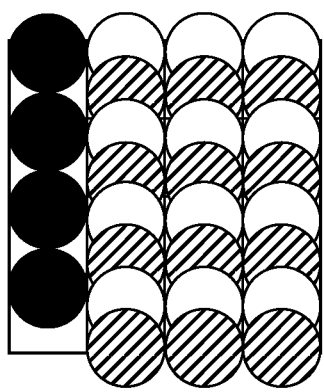
FIGS. 18A and 18B are diagrams showing printing states of dots on the printing medium.
Figure 18B:
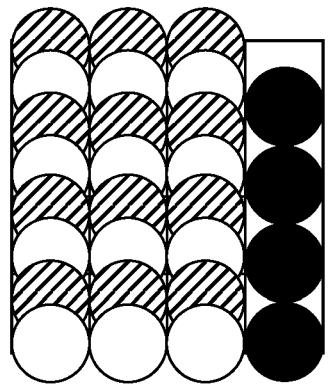

FIGS. 18A and 18B are diagrams showing printing states of dots on the printing medium in a case where each of the binary data for the first scan to the third scan after the quantization process has uniformly level 1. In both of the figures, a white circle indicates a single dot printed as one dot independently, a hatched circle indicates an overlap dot (double dot) in which two dots are printed to overlap, and a black circle indicates an overlap dot (triple dot) in which three dots are printed to overlap. Each lattice indicates a one-pixel region corresponding to 600 dpi×600 dpi, and each dot has a diameter of approximately 40 μm. FIG. 18A shows a state where there occurs no printing position displacement between the dot groups printed in the first scan to the third scan, and FIG. 18B shows a case where there occurs a printing position displacement of the third scan in the order of 20 μm in the y direction from the first and second scans.

In FIG. 18A where there occurs no printing position displacement, dots are arranged in three times of scans according to FIG. 17A to FIG. 17C. On the other hand, in FIG. 18B where there occurs the printing position displacement, the triple dots shown in the black circle in FIG. 18A are separated into the double dots and the single dots. The dots that are separated into double dots (hatched circles) and single dots (white circles), overlap by a number that is equal to the number of separations, and triple dots (black circles) are created. As a result, by comparing both figures, an area for covering the printing medium does not almost change between a case (FIG. 18A) where there occurs no printing position displacement and a case (FIG. 18B) where there occurs the printing position displacement. That is, according to the present embodiment, by applying the different dot patterns as shown in FIG. 17A to FIG. 17C to each of the first printing scan to the third printing scan, it is possible to output an image where the density unevenness due to the printing position displacement is not invited. It should be noted that the above embodiment is explained by taking a case where the printing position of the third scan is displaced from that of the first and second scans as an example, but even in a case where the printing position of any of the scans is displaced from that of the other two, the same effect can be obtained.

As long as the dot pattern is formed in such a manner that the coverage area onto the printing medium is kept to be substantially constant regardless of the printing position displacement, any dot pattern can be used effectively.

Figure 19C:
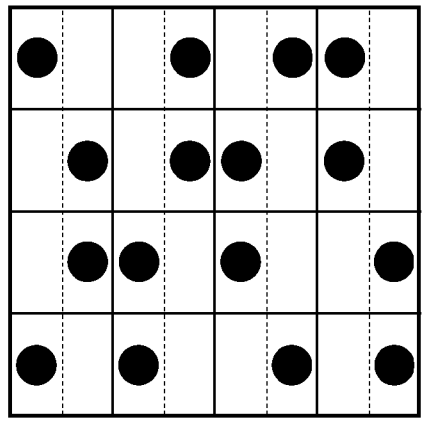
FIGS. 19A to 19C are diagrams each showing a dot pattern for each of a first scan, a second scan and a third scan in the third embodiment.
Figure 19B:
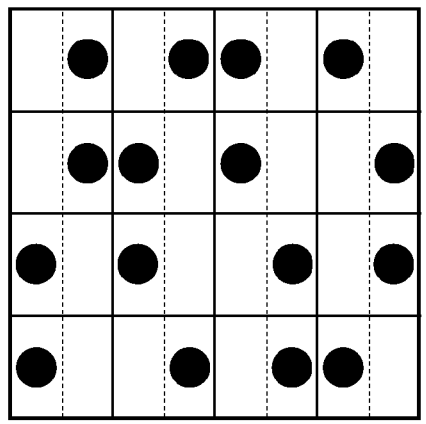
Figure 19A:
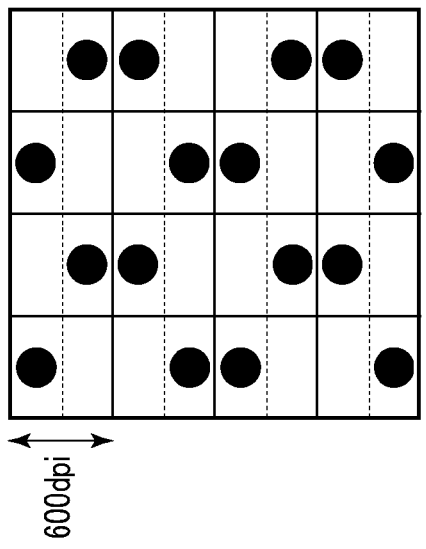

FIGS. 19A to 19C are diagrams showing another example of dot patterns for a first scan to a dot pattern for a third scan to level 1 which can be adopted in the present embodiment as similar to FIGS. 17A to 17C. In the present embodiment, an arrangement of the dot patterns, which is different from FIGS. 17A to 17C, change not only in the x direction but also in the y direction. Even by using this dot pattern, an area for covering the printing medium can be adapted not to change between a case where there occurs no printing position displacement and a case where there occurs the printing position displacement.

In the first to third embodiments explained above, the explanation is made of the multi-pass printings of two passes and three passes as examples, but the above embodiment can be applied to a multi-pass print of four or more passes without mentioning. In general, in a case of a M (M≥2)-pass print for printing an image on the same region by M times of scans, when a different dot pattern is prepared for each of the M quantization data after the quantization process, the effect of the above embodiment can be obtained. In each of the second and third embodiments, the multi-valued data is distributed into N pieces which are a value larger than the multi-pass number M and the N pieces of the multi-valued data each are subjected to quantization, which thereafter are combined for addition to obtain M pieces of the quantization data.

Fourth Embodiment

Figure 20:
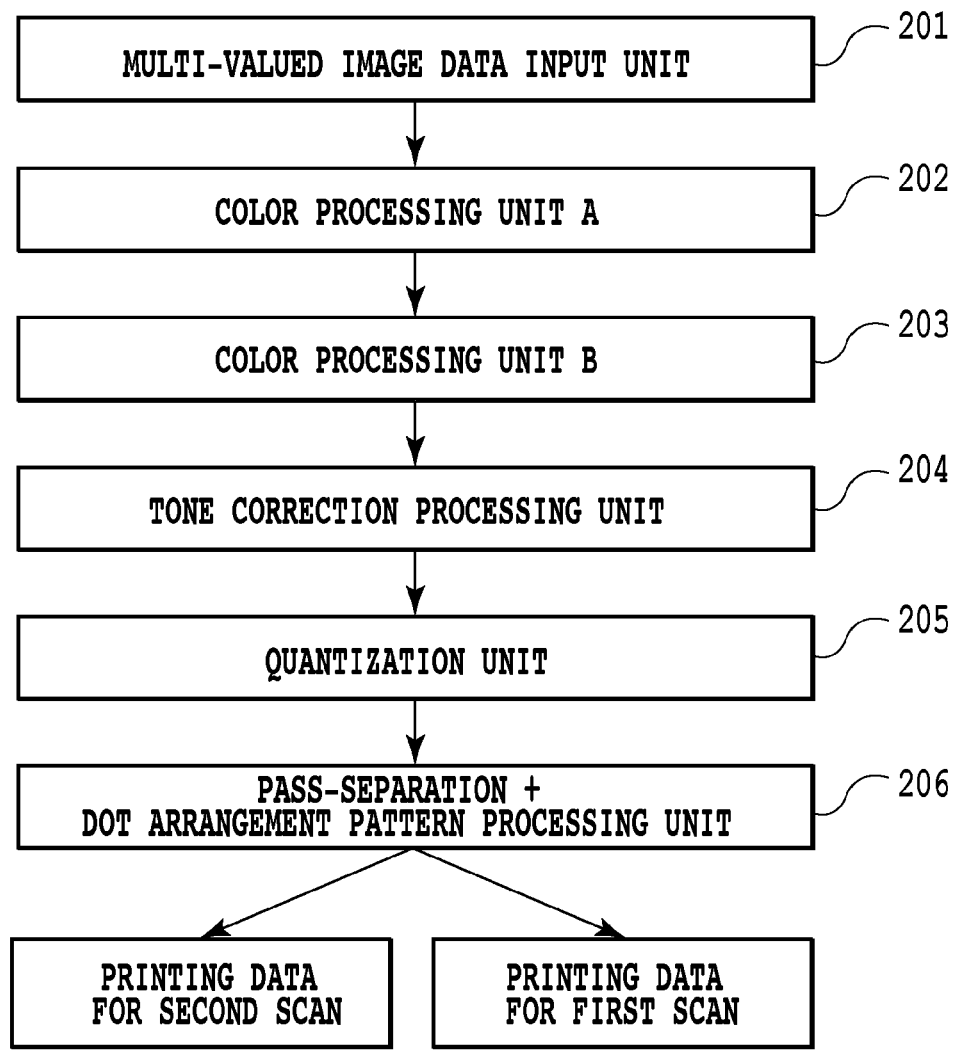
FIG. 20 is a block diagram explaining an image process in a fourth embodiment.

FIG. 20 is a block diagram explaining an image process in a case of performing a multi-pass printing of two passes in a fourth embodiment. Since the processes from a multi-valued image data input unit 201 to a tone correction processing unit 204 are the same as those in the first embodiment, the explanation is omitted.

256 values of multi-valued data (C'M'Y'K') subjected to a tone correction process are inputted to a quantization processing unit 205 without distribution to be quantized to three-valued data having values of level 0 to level 2 (Cu, M", Y" and K"). In this case, a general multi-valued error diffusion process can be used as the method of the quantization. Thereafter, the quantized three-valued data (C", M", Y" and K") is inputted to a pass-separation+dot arrangement pattern processing unit 206.

In the pass-separation+dot arrangement pattern processing unit 206, by referring to a table for a first scan and a table for a second scan in advance prepared, positions of printing dots in each scan are determined corresponding to the inputted three-valued data.

Figures 21A, 21B:
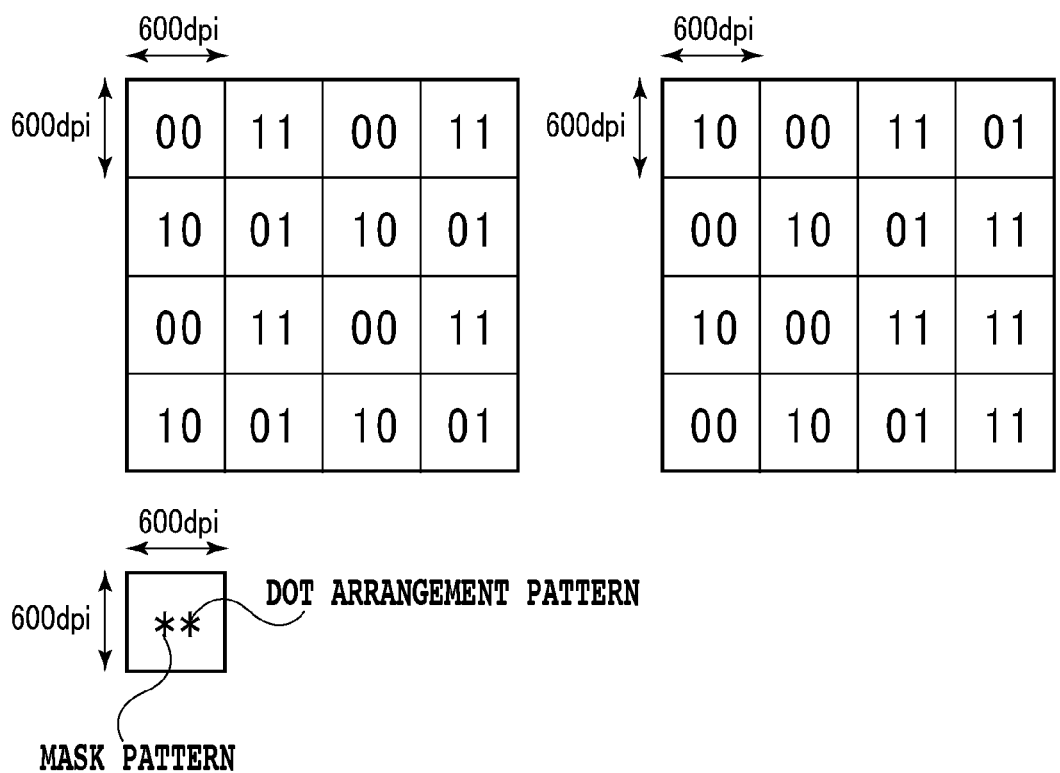
FIGS. 21A and 21B are diagrams showing tables for a first scan and a second scan.

FIGS. 21A and 21B are diagrams showing a table for a first scan (FIG. 21A) and a table for a second scan (FIG. 21B) usable in the present embodiment. In the figures, each lattice shows a one-pixel region of 600 dpi×600 dpi, and each table shows a region corresponding to four pixels×four pixels, each pixel having 600 dpi×600 dpi. Each table is constructed such that one pixel has a parameter of two bits, wherein a precede bit shows a mask data of the pixel and a subordinate bit shows a dot arrangement pattern of the pixel. These tables are in advance stored in the memory 3003 in the apparatus.

Figures 22A, 22B:
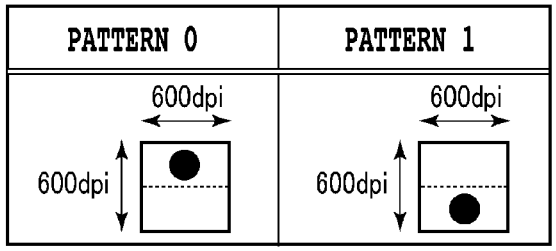
FIGS. 22A and 22B are diagrams showing mask data and a content of an arrangement pattern.

FIGS. 22A and 22B are diagrams showing the content of mask data shown by a precede bit and the content of arrangement patterns shown by a subordinate bit used in the present embodiment. By referring to FIG. 22A, as to the mask in the present embodiment, there are prepared two masks composed of mask 0 set in a case where the precede bit is 0 and mask 1 set in a case where the precede bit is 1. Each mask independently defines (1) allowing or (0) not allowing a print of a dot according to value of three-valued data of a pixel. For example, in a case where the value of the three-valued data is level 1, (0) not allowing the print of the dot is defined in mask 0, and (1) allowing the print of the dot is defined in mask 1. In a case where the value of the three-valued data is level 0, (0) not allowing the print of the dot is defined in both of mask 0 and mask 1, and in a case where the value of the three-valued data is level 2, (1) allowing the print of the dot is defined in both of mask 0 and mask 1.

On the other hand, FIG. 22B shows dot patterns each indicating the printing position in a case where the dot is printed. The pattern 0 set in a case where the subordinate bit in the table parameter is 0 shows that a dot is printed in the upper pixel among two pixels of 600 dpi×1200 dpi arranged in parallel corresponding to two pixels in the y direction×one pixel in the x direction. Meanwhile, the pattern 1 set in a case where the subordinate bit in the table parameter is 1 shows that a dot is printed in the lower pixel among the above two pixels.

FIGS. 23A to 23C are diagrams showing a state of data conversion in the pass-separation+dot arrangement pattern processing unit 206 in a case of using the tables shown in FIGS. 21A and 21B. FIG. 23A shows an example of three-valued data outputted from the quantization processing unit 205, and FIGS. 23B and 23C respectively show dot patterns for a first scan and a second scan obtained from the three-valued data and the tables shown in FIGS. 21A and 21B. In a case where Level 0 to Level 2 are arranged equally on some degree as shown in FIG. 21A in the three-valued data outputted from the quantization processing unit 205, dots are appropriately dispersed both in the dot pattern for the first scan and in the dot pattern for the second scan. As a result, there occur pixels where dots are printed to overlap both in the first scan and the second scan, which enables the coverage ratio onto the printing medium to be kept constant even in a case where the printing position displacement occurs in the same way as in the case of the above embodiment.

FIGS. 24A to 24C are diagrams showing another example of data conversion in the pass-separation+the dot arrangement pattern processing unit 206 in a case of using the tables shown in FIGS. 21A and 21B. FIG. 24A shows an example of three-valued data outputted from the quantization processing unit 205, and here, all the pixels have a value of level 2. In a case of such an input value, dot patterns for a first scan and a second scan are obtained as shown in FIGS. 24B and 24C. In a case where all the three-valued data outputted from the quantization processing unit 205 have level 2 (maximum density value), dots are printed in all the pixels in the dot pattern for the first scan and the dot pattern for the second scan. However, since pixel positions of 1200 dpi×600 dpi in which dots are actually printed are defined independently from each other between the first scan and the second scan, pixels in which dots are printed to overlap both in the first scan and in the second scan and pixels in which dots are printed in one of the first scan and the second scan exist to be mixed. As a result, in the same way as in the case of the above embodiment, the coverage ratio onto the printing medium can be kept constant even in a case where the printing position displacement occurs to restrict the density unevenness due to the printing position displacement.

In the fourth embodiment explained above, the explanation is made of the multi-pass printing of two passes as an example, but the above embodiment can be applied to a multi-pass print of three or more passes. In a case of a M (M≥3)-pass printing for printing an image on the same region by M times of scans, M pieces of tables of which the contents of the parameters differ from each other may be in advance prepared and then, the M pieces of the tables may be related to quantization data after the quantization process to generate M pieces of binary data.

Fifth Embodiment

Figure 27:
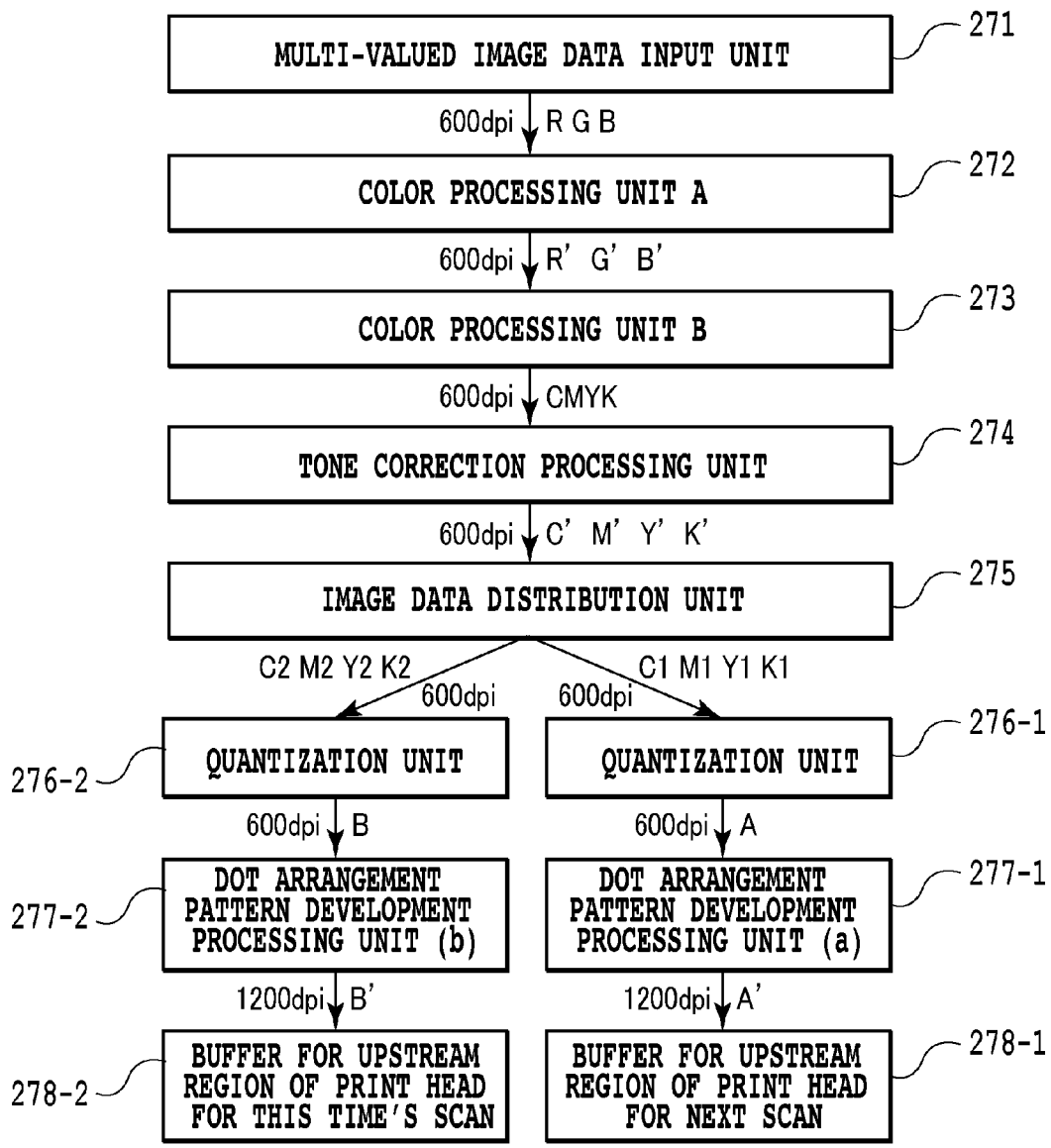
FIG. 27 is a block diagram explaining an image process in the fifth embodiment.

FIG. 27 is a block diagram explaining an image process executed in the control unit 3000 in a case of performing a multi-pass printing of two passes in a fifth embodiment. The present embodiment provides the construction for unifying the printing order of dot patterns on the printing medium by contrast to the first embodiment. Hereinafter, only components different from those in FIG. 8 explained in the first embodiment will be explained.

Multi-valued data (C1, M1, Y1 and K1) for a first scan generated in an image data distribution unit 275 is subjected to a quantization process in a quantization processing unit 276-1 for a first scan to be converted into quantization data A of any of 0 (non-print) or 1 (print). In addition, multi-valued data (C2, M2, Y2 and K2) for a second scan is subjected to a quantization process in a quantization processing unit 276-2 for a second scan to be converted into quantization data B of any of 0 (non-print) or 1 (print).

A dot arrangement pattern development processing unit 277-1 refers to a dot pattern for a first scan in advance prepared to convert binary data A of 600 dpi×600 dpi into binary data A' of 600 dpi in the x direction×1200 dpi in the y direction. A dot arrangement pattern development processing unit 277-2 refers to dot pattern b different from dot pattern a to convert binary data B of 600 dpi×600 dpi for a second scan into binary data B' of 600 dpi in the x direction×1200 dpi in the y direction. In the present embodiment, the resolution thus doubles only in the y direction (sub scan direction).

The binary data A' and B' of 600 dpi×1200 dpi outputted from the dot arrangement pattern development processing units 277-1 and 277-2 each are stored in regions having different print buffers and printed by different scans. Specially the binary data A' outputted from the dot arrangement pattern development processing units 277-1 is stored in a buffer 278-1 for the upstream region of the print head for the next scan. In addition, the binary data A' is printed by the upstream region of the print head, not by this time's scan but by the next time's scan. The binary data B' outputted from the dot arrangement pattern development processing units 277-2 is stored in a buffer 278-2 for the downstream region of the print head for this time's scan and is printed by the downstream region of the print head by this time's scan.

Figure 28:
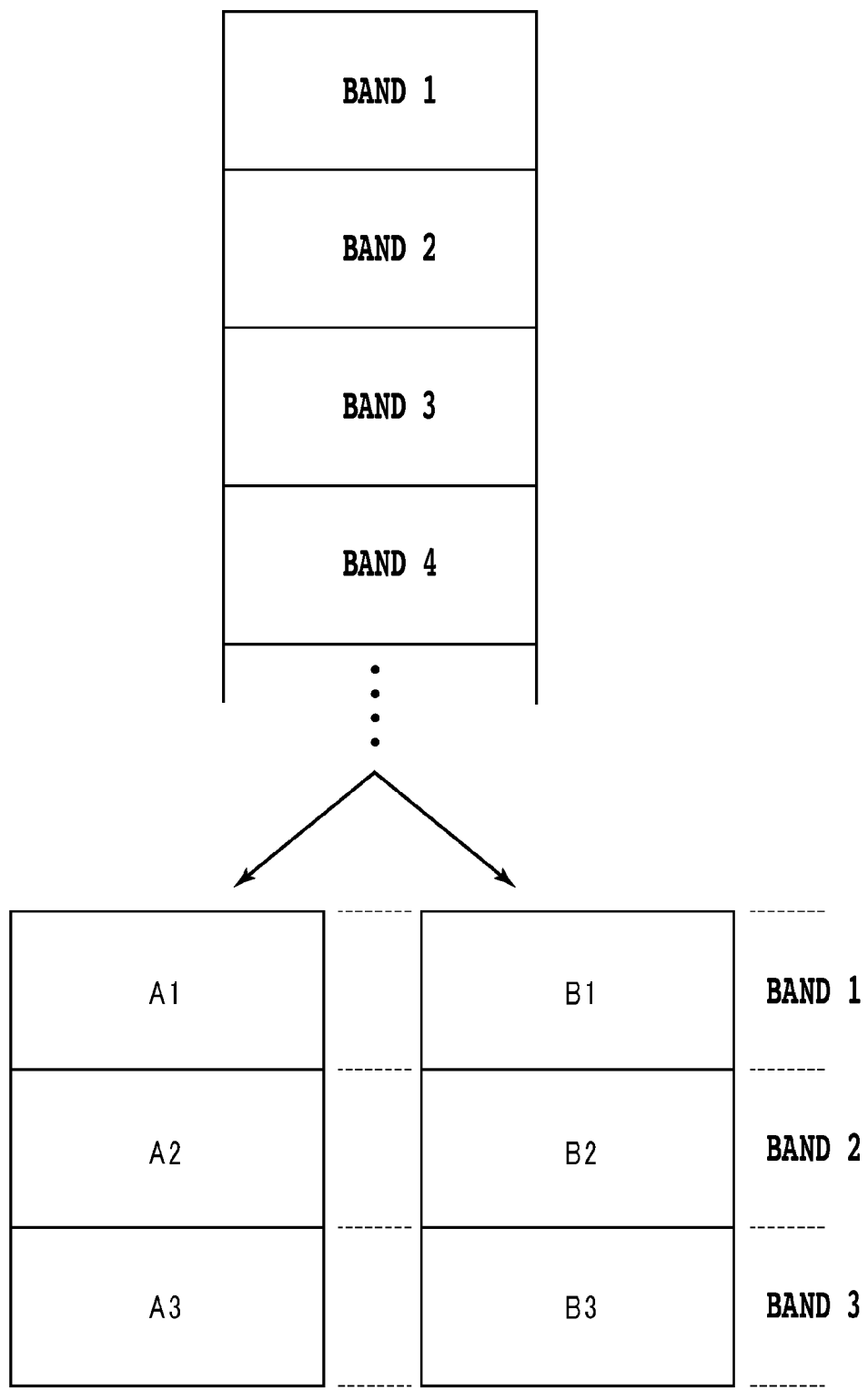
FIG. 28 is a diagram showing a corresponding relation between a band as a unit of an image region on the printing medium and binary data corresponding to it.

FIG. 28 is a schematic diagram showing a corresponding relation between a band as a unit of an image region on the printing medium and the binary data A or B of 600 dpi×600 dpi outputted from the quantization processing unit 276-1 or 276-2 corresponding to this band. Here, the band as a unit of the image region on the printing medium indicates an image region in which a print is completed by the same printing scan of the print head. By referring to FIG. 27, as to image data corresponding to band 1, after the image data distribution, one thereof is outputted to the quantization processing unit 276-1 for the quantization to be outputted as binary data A1 of 600 dpi×600 dpi. In addition, the other is outputted to the quantization processing unit 276-2 for the quantization to be outputted as binary data B1 of 600 dpi×600 dpi. Thereafter, the binary data A1 is outputted to the dot arrangement pattern development processing unit 277-1 for the processing to be converted into binary data A'1 of 600 dpi×1200 dpi. The binary data B1 is outputted to the dot arrangement pattern development processing unit 277-2 for the processing to be converted into binary data B'1 of 600 dpi×1200 dpi. Then, the binary data A'1 and the binary data B'1 are printed to overlap by different scans to complete an image of band 1. The same processes are executed to band 2 or others. That is, band n is distributed to binary data An and binary data Bn, which are converted into A'n and B'n by the dot arrangement pattern development processing units 278-1 and 278-2, which are printed to overlap with each other by different scans to complete an image of band n.

FIGS. 25A and 25B are diagrams explaining a printing method in a case of unifying the printing order of dot patterns to all the regions on the print medium. The figure shows a relative position relation among individual bands in respect to a conveyance direction of the print head. In a case of a multi-pass printing of two passes, 512 nozzles arranged in the print head can be thought to be divided into the upstream region having 256 nozzles and the downstream region having 256 nozzles. In regard to any of the bands, a print is performed by the upstream region of the print head by the first printing scan, and after conveyance movement of the printing medium corresponding to a length of the 256 nozzles, a print is performed by the downstream region of the print head by the second printing scan.

In FIG. 25A, the binary data A1 of band 1 is printed by the upstream region of the print head by dot pattern a. In the second scan performed after the conveyance movement of the printing medium corresponding to a length of 256 nozzles, the binary data B1 of band 1 is printed by the downstream region of the print head by dot pattern b, and at the same time, the binary data A2 of band 2 is printed by the upstream region of the print head by dot pattern a. Further, in the third scan performed after the conveyance movement of the printing medium corresponding to a length of 256 nozzles, the binary data B2 of band 2 is printed by the downstream region of the print head by dot pattern b, and at the same time, the binary data A3 of band 3 is printed by the upstream region of the print head in dot pattern a. By repeating such a printing movement, the print head is adapted to perform a print according to the different dot patterns between the upstream region and the downstream region in any printing scan. On the printing medium, however, the printing order of the dot patterns is unified such that dot patterns a are printed in all the bands and thereafter, dot patterns b are printed. That is, the printing method as shown in FIG. 25A is preferable since the density is unified between odd bands and even bands to make the density unevenness difficult to be invited.

Therefore, by referring to FIG. 27, in the present embodiment, the binary data A' n converted into 1200 dpi×600 dpi according to dot pattern a in the dot arrangement pattern development processing unit 277-1 is stored in the buffer 278-1 for the upstream region of the print head for the next scan and is printed by the next scan by the upstream region of the print head. In addition, the binary data B'n converted into 1200 dpi×600 dpi according to dot pattern b in the dot arrangement pattern development processing unit 277-2 is stored in the buffer 278-2 for the downstream region of the print head for this time's scan and is printed by this time's scan by the downstream region of the print head. The print head is adapted to perform one printing scan (this time's scan) when the binary data to be printed are stored both in the buffer for the upstream region and in the buffer for the downstream region. With such a memory management, the dot pattern for the first scan is printed in the first scan as the initial printing scan and the dot pattern for the second scan is printed in the second scan. Such a printing order can be unified in any region on the printing medium.

FIG. 25B shows a different printing method which can be adopted in the present embodiment for unifying the printing order of dot patterns in all the bands on the printing medium. In the figure, the binary data A1 of band 1 is printed by the upstream region of the print head by dot pattern a. In the second scan performed after the conveyance movement of the printing medium corresponding to a length of 256 nozzles, the binary data B1 of band 1 is printed by the downstream region of the print head by dot pattern b, and at the same time, the binary data B2 of band 2 is printed by the upstream region of the print head in dot pattern a. Further, in the third scan performed after the conveyance movement of the printing medium corresponding to a length of 256 nozzles, the binary data A2 of band 2 is printed by the downstream region of the print head in dot pattern b, and at the same time, the binary data A3 of band 3 is printed by the upstream region of the print head in dot pattern a. Also by repeating such a printing movement, on the printing medium, dot patterns a are printed in all the bands and thereafter, dot patterns b are printed, such that the density is unified between the odd band and the even band, making the density unevenness difficult to be invited.

In a case of adopting the present printing method, by referring to FIG. 27, there occurs a need of making the dot pattern in use be different for each band in the dot arrangement patterning process in regard to both of the binary data A outputted from the quantization processing unit 276-1 and the binary data B outputted from the quantization processing unit 276-2. Therefore, for example, the binary data A outputted from the quantization processing unit 276-1 and the binary data B outputted from the quantization processing unit 276-2 may be inputted alternately to the dot arrangement pattern development processing unit 277-1 and the dot arrangement pattern development processing unit 277-2. Alternatively the dot patterns used in the dot arrangement pattern development processing unit 277-1 and the dot arrangement pattern development processing unit 277-2 may be switched alternately between dot pattern a and dot pattern b.

Figure 26A:
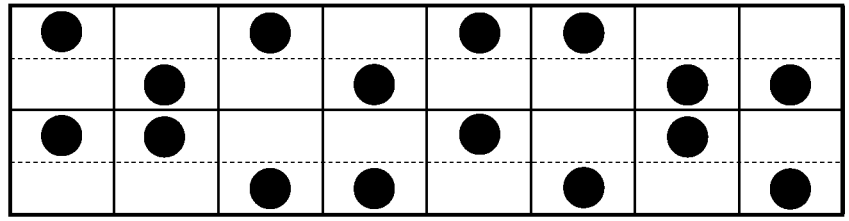
FIGS. 26A to 26D are diagrams showing dot patterns in a fifth embodiment.
Figure 26B:
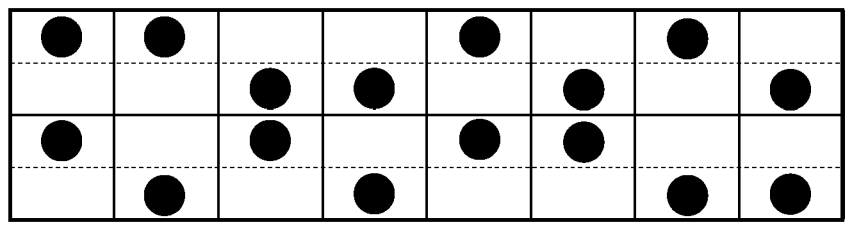
Figure 26C:
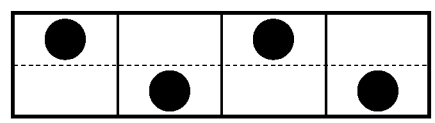
Figure 26D:
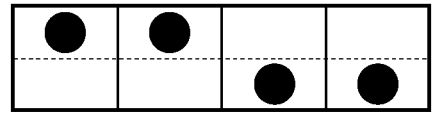

FIGS. 26A and 26B are diagrams showing a different example of a dot pattern for a first scan and a dot pattern for a second scan to level 1 which can be adopted in the present embodiment as in the case of FIGS. 10A and 10B. FIGS. 26A and 26B are dot patterns which are formed by using FIGS. 26C and 26D as basic patterns and each of which has 8 pixels×2 pixels composed by combining them in such a manner as to be exclusive with each other. Even in a case of using the dot pattern in the present example, it is possible to output an image in which the density unevenness due to the printing position displacement is not caused in the same way as the dot patterns shown in FIGS. 10A and 10B. As long as the dot patterns are formed in such a manner that the coverage area onto the printing medium is kept to be substantially constant regardless of the printing position displacement, a print may be performed while keeping the printing order of the dot patterns to each band by applying these dot patterns to the first printing scan and the second scan. In this manner, it is possible to output an image in which the density unevenness due to the printing position displacement is reduced.

In the above embodiment, the explanation is made primarily of the dot pattern difficult to be adversely affected by the printing position displacement in the conveyance direction (y direction), but the present invention can be applied also to a case of the printing position displacement in the main scan direction. In this case, in the above embodiment, the printing resolution only in the y direction is set as 1200 dpi, but for further enhancing a resistance to an adverse effect due to the printing position displacement in the main scan direction, it is effective to also set the printing resolution in the x direction as 1200 dpi.

However, a value of the resolution or a size of the dot is not limited to the above value. The effect of the present invention can be achieved as long as the coverage ratio onto the printing medium between a case where the printing position displacement occurs and a case where the printing position displacement does not occur does not so much change. Accordingly, the value of the resolution or the size of the dot is not particularly limited if the values of both are defined to be associated with each other. It goes without saying that a size of the dot pattern is not limited to the region of 4 pixels×4 pixels or 8 pixels×2 pixels as in the case of the above embodiments.

In addition, in the above embodiment, the error diffusion is adopted as the quantization method, but the present invention is not limited thereto. In the present invention, it is only required to use the dot pattern at final binarization corresponding to the printing resolution, and in regard to the quantization process before it, there can be used various methods such as a dither method in addition to the error diffusion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-206678, filed Sep. 15, 2010, and 2010-206679, filed Sep. 15, 2010, which are hereby incorporated by reference herein in their entirety.

What is claimed is:

1. An image processing apparatus for executing an image process for printing an image on a printing medium by causing a print head which prints dots to scan relative to a predetermined region on the printing medium plural times resulting in a plurality of scans comprising:
   a control unit which comprises:
      a central processing unit;
      a distribution unit programmed to distribute multi-valued image data corresponding to the predetermined region into at least a first multi-valued data corresponding to the predetermined region for a first scan and a second multi-valued data corresponding to the predetermined region for a second scan;
      a quantization unit programmed to quantize each of the first multi-valued data and the second multi-valued data to generate a first quantization data and a second quantization data; and
      a conversion unit programmed to convert the first quantization data into a first print data used for printing dots by the first scan to the predetermined region by using a first dot pattern which indicates number and positions of dots printed to pixel areas in the predetermined region in accordance with a value of the first quantization data and convert the second quantization data into a second print data used for printing dots by the second scan to the predetermined region by using a second dot pattern which indicates number and positions of dots printed to pixel areas in the predetermined region in accordance with a value of the second quantization data,
   wherein (i) at least one pixel area for printing dot indicated by the second dot pattern corresponding to the second quantization data having a predetermined value is positioned at a same position as a pixel area for printing dot indicated by the first dot pattern corresponding to the first quantization data having the predetermined value and (ii) at least one pixel area for printing dot indicated by the second dot pattern corresponding to the second quantization data having the predetermined value is positioned at a same position as a pixel area for not printing dot indicated by the first dot pattern corresponding to the first quantization data having the predetermined value.

2. The image processing apparatus according to claim 1, wherein the quantization unit quantizes each of the first multi-valued data and the second multi-valued data by an error diffusion method.

3. The image processing apparatus according to claim 1, wherein the first dot pattern corresponding to the first quantization data having the predetermined value and the second dot pattern corresponding to the second quantization data having the predetermined value are dot patterns by which a coverage area of the dots is kept to be substantially constant regardless of a printing position displacement between the first scan and the second scan.

4. A storage medium for storing programs for operating a computer as an image processing apparatus according to claim 1.

5. The image processing apparatus according to claim 1, further comprising:
- a printing unit configured to cause the print head to scan the printing medium printing dots.

6. The image processing apparatus according to claim 5, wherein the printing unit causes the print head to scan to each of a first scan region on the printing medium and a second scan region which adjoins the first scan region in a printing medium conveying direction on the printing medium so that the printing order of the first and second dot patterns is constant in the first and second regions on the printing medium.

7. The image processing apparatus according to claim 1, wherein (i) about half of pixel areas for printing dot indicated by the second dot pattern corresponding to the second quantization data having a predetermined value are positioned at same positions as pixel areas for printing dot indicated by the first dot pattern corresponding to the first quantization data having the predetermined value and (ii) remaining pixel areas for printing dot indicated by the second dot pattern corresponding to the second quantization data having the predetermined value are positioned at same position as a pixel areas for not printing dot indicated by the first dot pattern corresponding to the first quantization data having the predetermined value.

8. An image processing method for printing an image on a printing medium by causing a print head which prints dots to scan relative to a predetermined region on the printing medium plural times resulting in a plurality of scans comprising the steps of:
- a distribution step for distributing multi-valued image data corresponding to the predetermined region into at least a first multi-valued data corresponding to the predetermined region for a first scan and a second multi-valued data corresponding to the predetermined region for a second scan;
- a quantization step for quantizing each of the first multi-valued data and the second multi-valued data to generate a first quantization data and a second quantization data; and
- a conversion step for converting the first quantization data into a first print data used for printing dots by the first scan to the predetermined region by using a first dot pattern which indicates number and positions of dots printed to pixel areas in the predetermined region in accordance with a value of the first quantization data and convert the second quantization data into a second print data used for printing dots by the second scan to the predetermined region by using a second dot pattern which indicates number and positions of dots printed to pixel areas in the predetermined region in accordance with a value of the second quantization data,
wherein (i) at least one pixel area for printing dot indicated by the second dot pattern corresponding to the second quantization data having a predetermined value is positioned at a same position as a pixel area for printing dot indicated by the first dot pattern corresponding to the first quantization data having the predetermined value and (ii) at least one pixel area for printing dot indicated by the second dot pattern corresponding to the second quantization data having the predetermined value is positioned at a same position as a pixel area for not printing dot indicated by the first dot pattern corresponding to the first quantization data having the predetermined value.

* * * * *